(12) United States Patent
Kunze

(10) Patent No.: US 8,607,200 B2
(45) Date of Patent: Dec. 10, 2013

(54) EXECUTING A WEB APPLICATION AT DIFFERENT STAGES IN THE APPLICATION LIFE CYCLE

(75) Inventor: Tobias Kunze, Palo Alto, CA (US)

(73) Assignee: Red Hat, Inc., Raleigh, NC (US)

( * ) Notice: Subject to any disclaimer, the term of this patent is extended or adjusted under 35 U.S.C. 154(b) by 164 days.

(21) Appl. No.: 13/151,227

(22) Filed: Jun. 1, 2011

(65) Prior Publication Data

US 2012/0066665 A1 Mar. 15, 2012

Related U.S. Application Data

(60) Provisional application No. 61/350,442, filed on Jun. 1, 2010, provisional application No. 61/350,444, filed on Jun. 1, 2010.

(51) Int. Cl.
*G06F 9/44* (2006.01)
(52) U.S. Cl.
USPC .......................................................... 717/124
(58) Field of Classification Search
None
See application file for complete search history.

(56) References Cited

U.S. PATENT DOCUMENTS

| | | | |
|---|---|---|---|
| 4,751,635 A * | 6/1988 | Kret | 1/1 |
| 7,080,351 B1 * | 7/2006 | Kirkpatrick et al. | 717/102 |
| 7,668,870 B1 * | 2/2010 | Sykes et al. | 707/690 |
| 8,265,916 B1 * | 9/2012 | Portal et al. | 703/13 |
| 2010/0027552 A1 * | 2/2010 | Hill | 370/401 |

* cited by examiner

*Primary Examiner* — Wei Zhen
*Assistant Examiner* — Lanny Ung
(74) *Attorney, Agent, or Firm* — Lowenstein Sandler LLP

(57) ABSTRACT

A method for hosting multiple life cycle stages of a web application includes installing a web application in a first environment together with a first version of a support package containing support software components for the web application, the first environment corresponding to a first life cycle stage of the web application, and executing the web application in the first environment together with the first version of the support package. The method further includes installing the web application in a second environment together with a second version of the support package containing support software components for the web application, the second environment corresponding to a second life cycle stage of the web application that succeeds the first life cycle stage of the web application, and executing the web application in the second environment together with the second version of the support package.

24 Claims, 26 Drawing Sheets

FIG. 3B

Data Collection Structures

Transaction Record (S/D Variants)

626B

```
X-Record (S)      350-548
                    1,000
info
    application-id
    is-page
    is-partial
records s-record
labels
    label-id
    ...
```

| Minimum | | |
|---|---|---|
| | | 28 |
| s-record | | 320 |
| labels | (1) | 2 |
| Total | | 350 |
| Maximum | | |
| | | 28 |
| s-record | | 320 |
| labels | (100) | 200 |
| Total | | 548 |

626A

```
X-Record (D)      422-6,588
                    100
info
    application-id
    is-page
    is-partial
records
    {b-records
        n-records
        b-record
        ...}?
    r-record
    d-record
    s-record
labels
    label-id
    ...
```

| Minimum | | |
|---|---|---|
| | | 28 |
| b-records | (0) | 0 |
| r-record | | 32 |
| d-record | | 40 |
| s-record | | 320 |
| labels | (1) | 2 |
| Total | | 422 |
| Maximum | | |
| | | 28 |
| b-records | (20) | 5,840 |
| r-record | | 32 |
| d-record | | 40 |
| s-record | | 448 |
| labels | (100) | 200 |
| Total | | 6,588 |

FIG. 7A

Samples

**M\*-Sample** 3,764-36,164  /—644
0.1
*k-sample*
*tasks*
   total
   running
   sleeping
   stopped
   zombies
   {*task-stats*
      task-id
      component-id
      *cpu*
         system-time
         user-time
      *memory*
         resident-size
         virtual-size
      *file-descriptors*
         max
         files
         sockets}\*

Minimum
                  164
task-stats (100) 3,600
Total            3,764

Maximum
                  164
task-stats (1000) 36,000
Total            36,164

---

M-Sample 204-396  /—643
0.1
*k-sample*
*tasks*
   total
   running
   sleeping
   stopped
   zombies
   {*component-stats* component-id
      *cpu*
         system-time
         user-time
      *memory*
         resident-size
         virtual-size
      *file-descriptors*
         max
         files
         sockets
      *workers*
         max
         used
      {*jdbc-connections*
         max
         used}?}+

Minimum
                  164
cmp.-stats (1) 40
Total            204

Maximum
                  164
cmp.-stats (6) 232
Total            396

---

K-Sample 164  /—701
0.1
*cpu*
   system
   user
   nice
   idle
   wait
   hardware-interrupts
   software-interrupts
   steal-time
*memory*
   total
   used
   free
   buffers
   cached
*swap*
   total
   used
*file-descriptors*
   max
   files
   sockets
*disk*
   root
      total
      used
   *var*
      ...
   *opt*
      ...
   *srv*
      ...
*network*
   *front*
      sockets
      bytes-in
      bytes-out
   *back*
      ...
   *cluster*
      ...
   *console*
      ...

EXECUTING A WEB APPLICATION AT DIFFERENT STAGES IN THE APPLICATION LIFE CYCLE

RELATED APPLICATIONS

This application is related to and claims the benefit of U.S. Provisional Patent application Ser. No. 61/350,442 filed Jun. 1, 2010 and U.S. Provisional Patent application Ser. No. 61/350,444 filed Jun. 1, 2010, which are hereby incorporated by reference.

TECHNICAL FIELD

Embodiments of the present invention relate to the application deployment, and more specifically to facilitating the execution of web applications in the cloud.

BACKGROUND

Web applications are programs that receive and act on requests in web or other Internet protocols, such as HTTP. It is common for a user to use a web application by using a browser executing on the user's client computer system to send requests in a web protocol via the Internet to a server computer system on which the web application is executing. For example, Yahoo Mail is an email application that is implemented in this way. It is also common for automatic user agents to interact with web applications in web protocols in the same fashion.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 3B illustrates an exemplary user interface for specifying dependencies of a web application, in accordance with some embodiments.

FIGS. 7A-7D are data structure diagrams showing schemas for each of several types of monitoring data captured or otherwise used by the facility in some embodiments.

FIG. 10 is an exemplary Log user interface presented by the facility in some embodiments.

FIG. 11A is an exemplary Clusters user interface presented by the facility in some embodiments.

DETAILED DESCRIPTION

Figure 1:
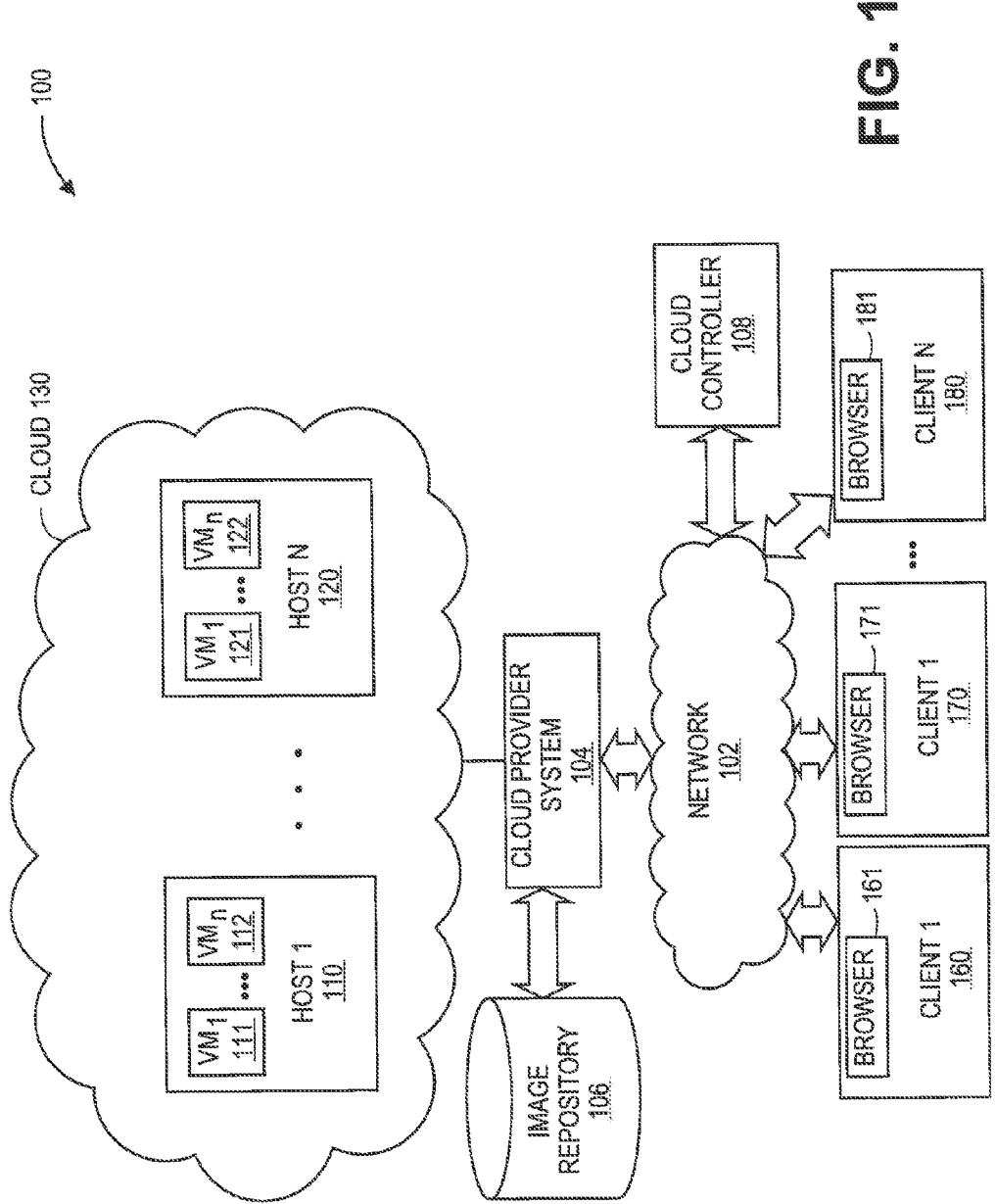
FIG. 1 is a block diagram of a network architecture in which embodiments of the invention may operate.

Described herein are methods and systems for facilitating the execution of a web application in a cloud computing environment. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include such software components as a kernel and an operating system. For programs that are web applications, the additional software can further include such software components as middleware and a framework. Customers that have installed and are executing their programs "in the cloud" and others typically communicate with the executing program from remote geographic locations using Internet protocols.

While many web applications are suitable for execution in the cloud, it often requires significant expertise and effort in order to install, execute, and manage a web application in the cloud. For example, an administrator typically must identify all of the software components that a web application needs in order to execute, and what versions of those software components are acceptable. The administrator typically must obtain, install, and appropriately configure each such software component, as well as the application itself. Where this high level of expertise and effort has been invested in order to get a web application running on a particular hypervisor and in a particular provider's cloud, a similarly high level of expertise and effort usually must be subsequently invested in order to execute the web application instead or in addition on a different hypervisor and/or in a different particular provider's cloud. Also, it can be difficult or impossible to obtain useful information about how the application is performing and otherwise behaving when executing in the cloud.

Accordingly, a software and/or hardware facility for facilitating the execution of web applications in the cloud is provided. The facility may operate as a virtual machine running on top of a hypervisor in a host. In some embodiments, the facility is created by installing on the host a single package ("the slab") that provides support software and typically contains a kernel, an operating system, and middleware and/or a framework. A web application runs on top of this slab.

In some embodiments, the software components contained in the slab are customizable based on declared dependencies of the application. In some embodiments, the facility makes use of a dynamic system (referred to as "cartridge system") to select and manage the software components that are included in a particular slab for a particular application. In various embodiments, the slab is implemented for multiple kinds of hypervisors and/or multiple cloud providers, enabling the slab to provide a consistent interface to the application across multiple underlying platforms. This provides portability across these platforms of applications written to run on top of a slab. In this way, the facility is said to provide an application interface for cloud-based web applications.

In some embodiments, the slab is implemented on a number of different platforms used at different stages in the web application's life cycle, such as a development platform, a testing and/or quality assurance platform, a staging platform, and a production platform. This enables the application to be executed under very similar conditions at each stage in the application's life cycle.

In some embodiments, the slab is instrumented, providing rich application monitoring without any need to insert agents into the application's code. In some embodiments, at least a portion of the facility's monitoring is directed to analyzing the application's processing of transactions. Each transaction is the combination of a request received for the application from the client with the application's response to this request. In some embodiments, the facility maintains the data collected by the monitoring in the slab, and provides a management console in the slab that enables an administrative user to manage the slab and application, as well as analyze and display monitoring data for the application collected across a cluster of virtual machines.

By performing in some or all of the ways outlined above, the facility greatly streamlines the process of installing, configuring, executing, maintaining, and relocating an application in the cloud; provides a consistent environment for executing the application throughout its life cycle; and/or produces valuable monitoring data about the application's performance.

FIG. 1 is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In one embodiment, the cloud controller 108 provides slabs associated with different applications to the cloud provider 104. As will be discussed in more detail below, a slab is a pre-generated image that can be provided to the cloud provider 104 and stored in an image repository 106. Upon receiving a command identifying a specific slab, the cloud provider 104 retrieves the corresponding image from the image repository 106, create an instance of it an loads it to the host 110, 120 to run on top of a hypervisor (not shown). The command may be received from the cloud controller 108 or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2A:
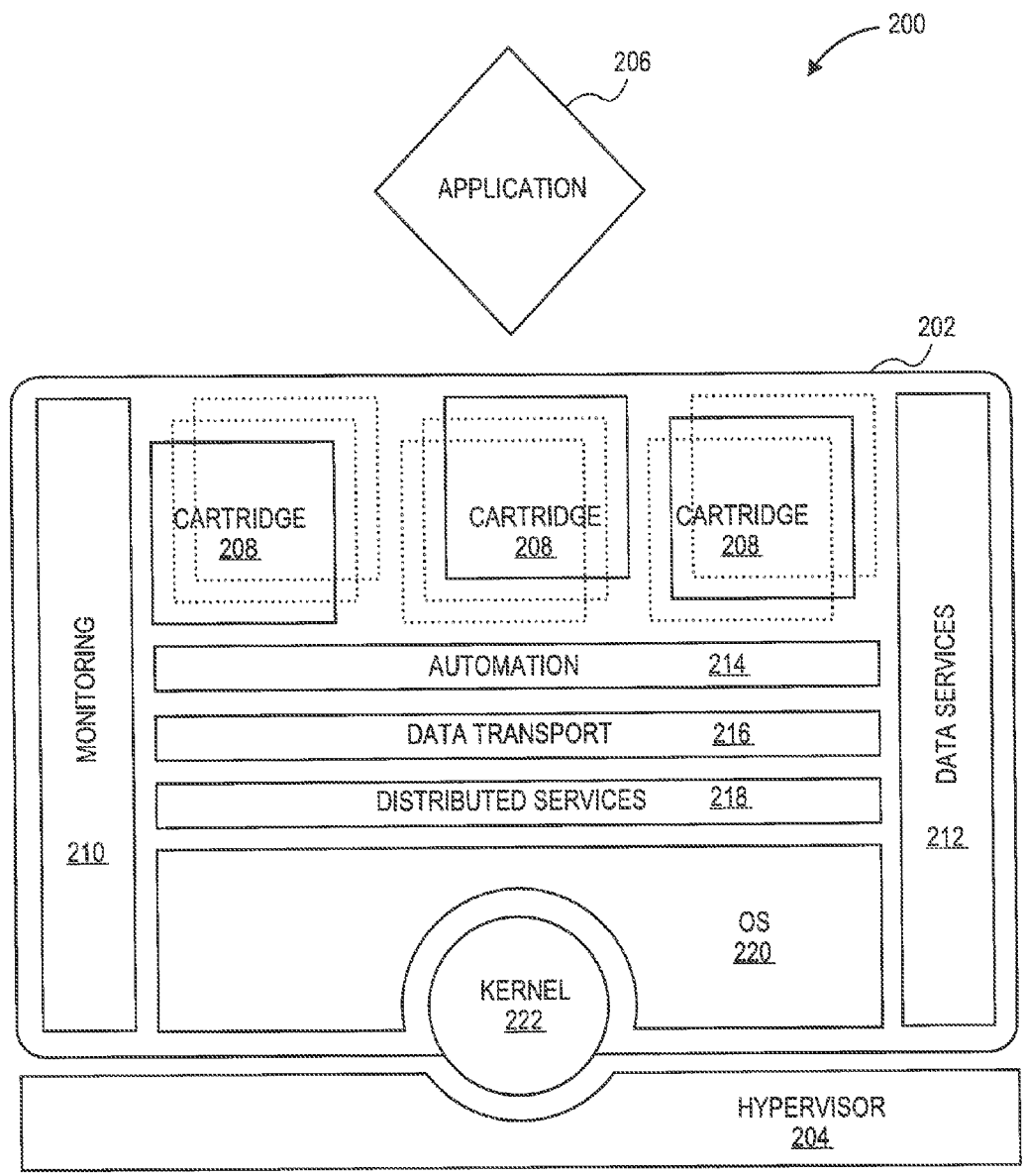
FIG. 2A is a block diagram of one embodiment of a system facilitating the execution of a web application in a cloud.

FIG. 2A is a block diagram of one embodiment of a system 200 facilitating the execution of a web application in a cloud. System 200 may reside on a host 110, 120 of FIG. 1 and may include slab 202 running on top of a hypervisor 204. Application 206 may be a web application running on top of the slab 202. The hypervisor 204 virtualizes access to the underlying host hardware (e.g., one or more processors, memory, I/O devices, and other hardware components) for the operating system (guest OS) 220, as well as the user(s) of the application 206. The hypervisor 204 is also known as a virtual machine monitor (VMM), a kernel-based hypervisor, or a host operating system. The hypervisor 204 presents to the guest 140 emulated hardware and software components, such that the specifics of the host is hidden from the guest OS 220, its user(s) and its client(s).

The slab 202 includes a platform core and a component layer that provides a variety of middleware and other support software in form of cartridges 208. The platform core includes the guest OS 220 including the kernel 222, distributed services 218, a data transport 216, an automation component 214, data services 212 and a monitoring component 210. Distributed services 218 allow communication between different slabs when the application 206 runs on multiple slabs 202 executing on one or more hypervisors 204 in one or more hosts. The monitoring component 210 receives monitoring data from the cartridges 208 as well as the OS 220 and the kernel 222 and passes it the data services 212 that store this data in a data store and allows querying of this data by the user(s) and/or client(s). The monitoring data may describe the behavior and measure the performance of cartridges 208, other components of the slab, elements of hardware and the application 206. Data transport 216 communicates data between different components of the slab 202 and between different slabs when applicable. The automation component 214 orchestrates the dynamic aspects of the slab such as installation and deinstallation of cartridges, configuration, starting and stopping of services, etc.

Figure 2B:
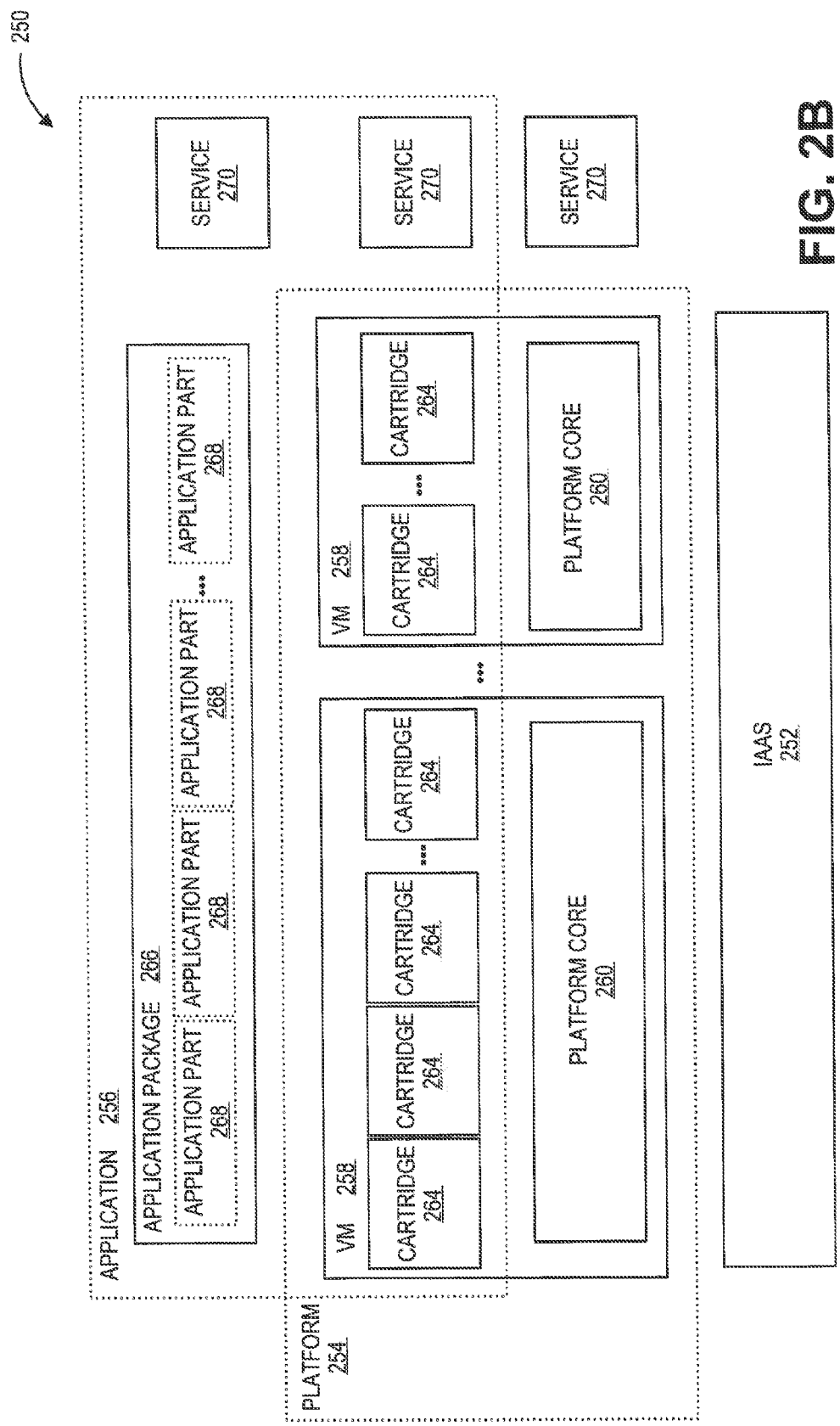
FIG. 2B is a block diagram of one embodiment of a Platform-as-a-Service approach for facilitating the execution of a web application in a cloud.

FIG. 2B is a block diagram of one embodiment of a Platform-as-a-Service (PaaS) architecture 250 for facilitating the execution of a web application in a cloud. The PaaS architecture 250 includes an Infrastructure-as-a-Service (IaaS) 252, which consists of hardware (e.g., one or more processors, memory, IO devices, etc.) and a hypervisor, and a platform 254 running on the IaaS 252. The platform 254 is delivered as an auto-clustering virtual machine image, resulting in one or more virtual machines 258, each containing a platform core 260 and cartridges 264. Application 256 includes an application package 266 containing multiple application parts 268 which may correspond to different individually deployable modules of the application. Application 256 may be an n-tiered web applications based on languages such as Java, Ruby, Python, PHP or the like. The PaaS architecture 250 may also include external services 270 on which the application 256 depends.

The PaaS architecture 250 automates the process of installing and configuring the application 256. In addition, the PaaS architecture 250 provides a virtually care-free runtime environment for the application 256 and produces monitoring data about the performance of the application 256.

In some embodiments, the platform operates directly in a virtual machine that is not in the cloud. In some embodiments, the platform operates directly in a physical machine, rather than in a virtual machine.

Figure 3A:
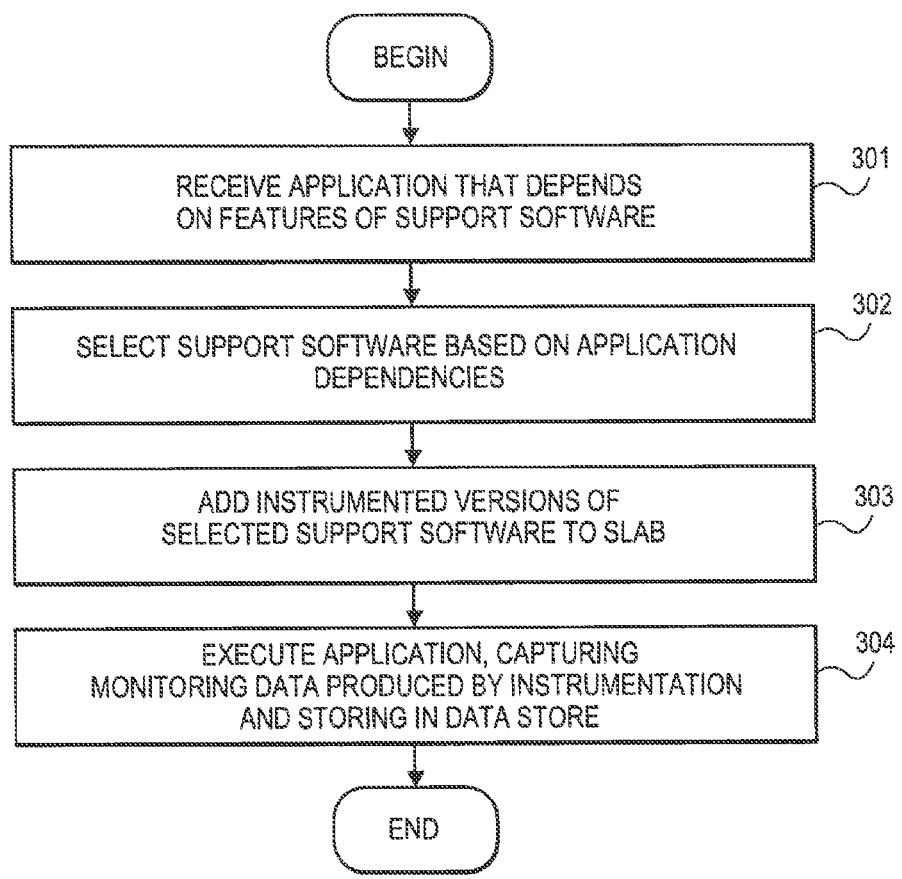
FIG. 3A is a flow diagram of one embodiment of a method for facilitating the execution of a web application in a cloud.

FIG. 3A is a flow diagram of one embodiment of a method for facilitating the execution of an application in a cloud. The method is performed by processing logic that may comprise hardware (circuitry, dedicated logic, etc.), software (such as is run on a general purpose computer system or a dedicated machine), or a combination of both. In one embodiment, the method is performed by a host 110, 120 of FIG. 1.

At block 301, the host receives an application to be run. The application may be received in the form of an application package from the user or from the cloud controller that automatically creates an application package based on user input of information pertaining to the application via a user interface. The host may include a slab instance previously installed by a cloud provider (e.g., in response to a command issued by the cloud controller or the user). The slab instance may be an image of a virtual machine or a physical system.

At block 302, the host determines dependencies of the application on features of support software and selects support software based on the determined dependencies. In some embodiments, the received application includes explicit declarations of dependencies of the application on features of support software. In some embodiments, the host analyzes the application's code to automatically infer these dependencies.

At block 303, the host adds instrumented versions of the selected support software to the slab instance. At block 304, the host executes the application on top of the slab instance. As part of execution of the application, the host captures monitoring data produced by instrumentation in the support software included in the slab, and stores this captured monitoring data in a data store within the slab. One embodiment of capturing the monitoring data will be discussed in more detail below in conjunction with FIG. 6.

Figure 3B:
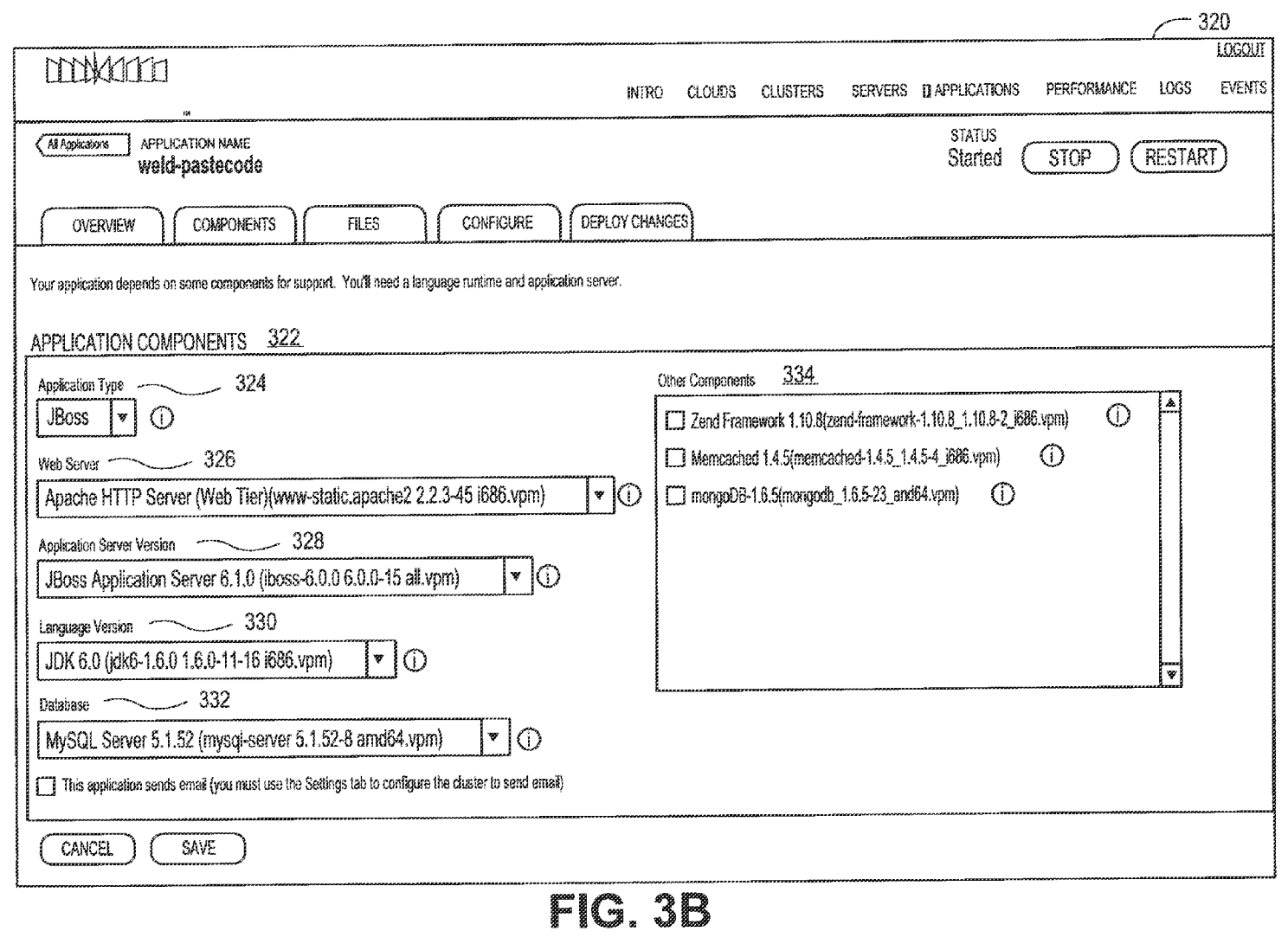

FIG. 3B illustrates an exemplary user interface 320 for specifying dependencies of a web application, in accordance with some embodiments. As shown, a user can select application components 322 for an application. The application components 322 include properties of the application (e.g., application type 324) and dependencies of the application on features of support software (e.g., web server 326, application server version 328, language version 330, database 332 and other components 334).

Figure 3C:
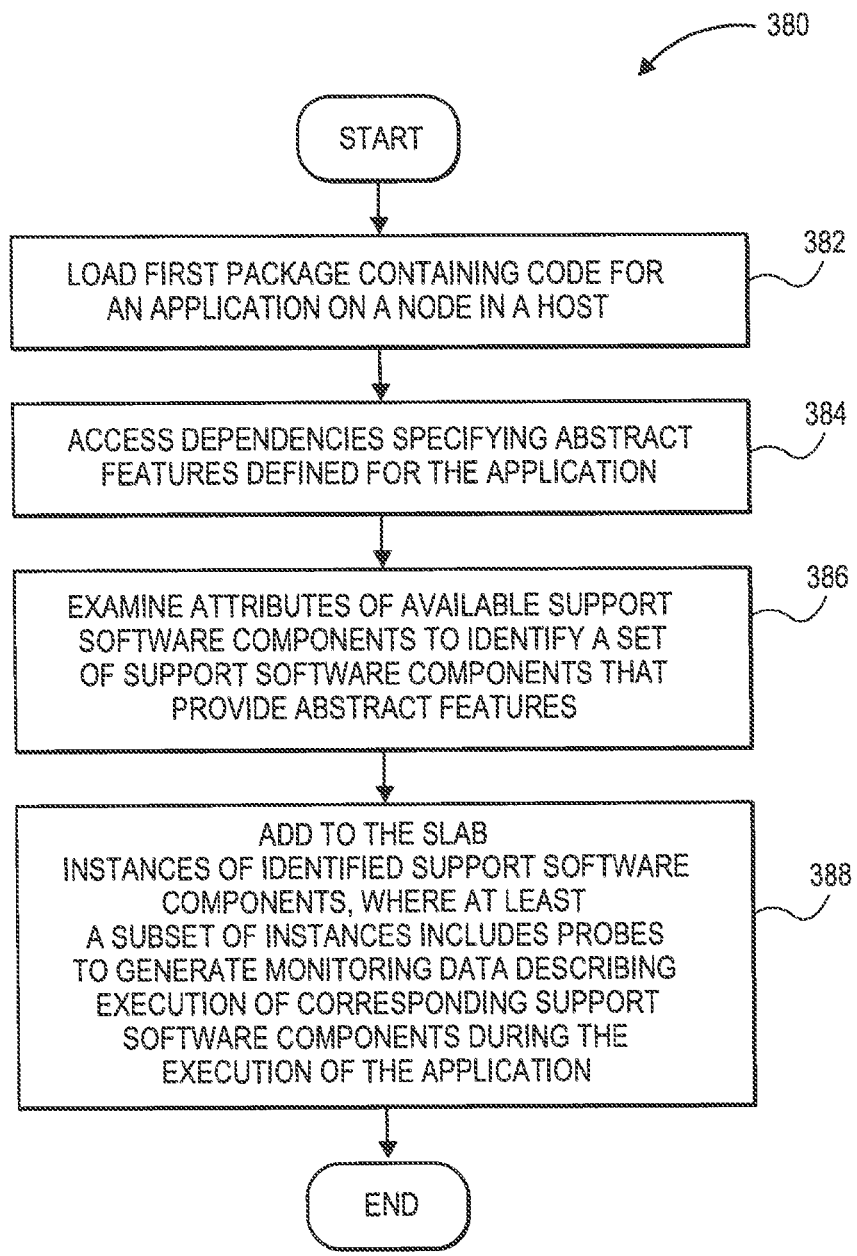
FIG. 3C is a flow diagram of one embodiment of a method for creating an environment to support the execution of a web application in a cloud.

FIG. 3C is a flow diagram of one embodiment of a method 380 for creating an environment to support the execution of a web application in a cloud. The method is performed by processing logic that may comprise hardware (circuitry, dedicated logic, etc.), software (such as is run on a general purpose computer system or a dedicated machine), or a combination of both. In one embodiment, the method is performed by a host 110, 120 of FIG. 1.

At block 382, the host loads a package containing code for the application program on a node of the cloud computing environment. The node may be a virtual machine running on top of a hypervisor in the host as an instance of a slab.

At block 384, the host accesses dependencies specifying abstract features that have been explicitly defined for the application program in the package. At block 386, the host examines attributes of available support software components to identify a set of support software components that collectively provide the abstract features specified by the accessed dependencies.

At block 388, the host adds instances of the identified support software components to the slab, with at least a subset of these instances having been instrumented to generate and export monitoring data describing the execution of the instances in support of the execution of the application. The slab further contains code for collecting exported monitoring data and storing it within the slab and code for aggregating the monitoring data stored within the second package and making it available for querying.

Figure 4:
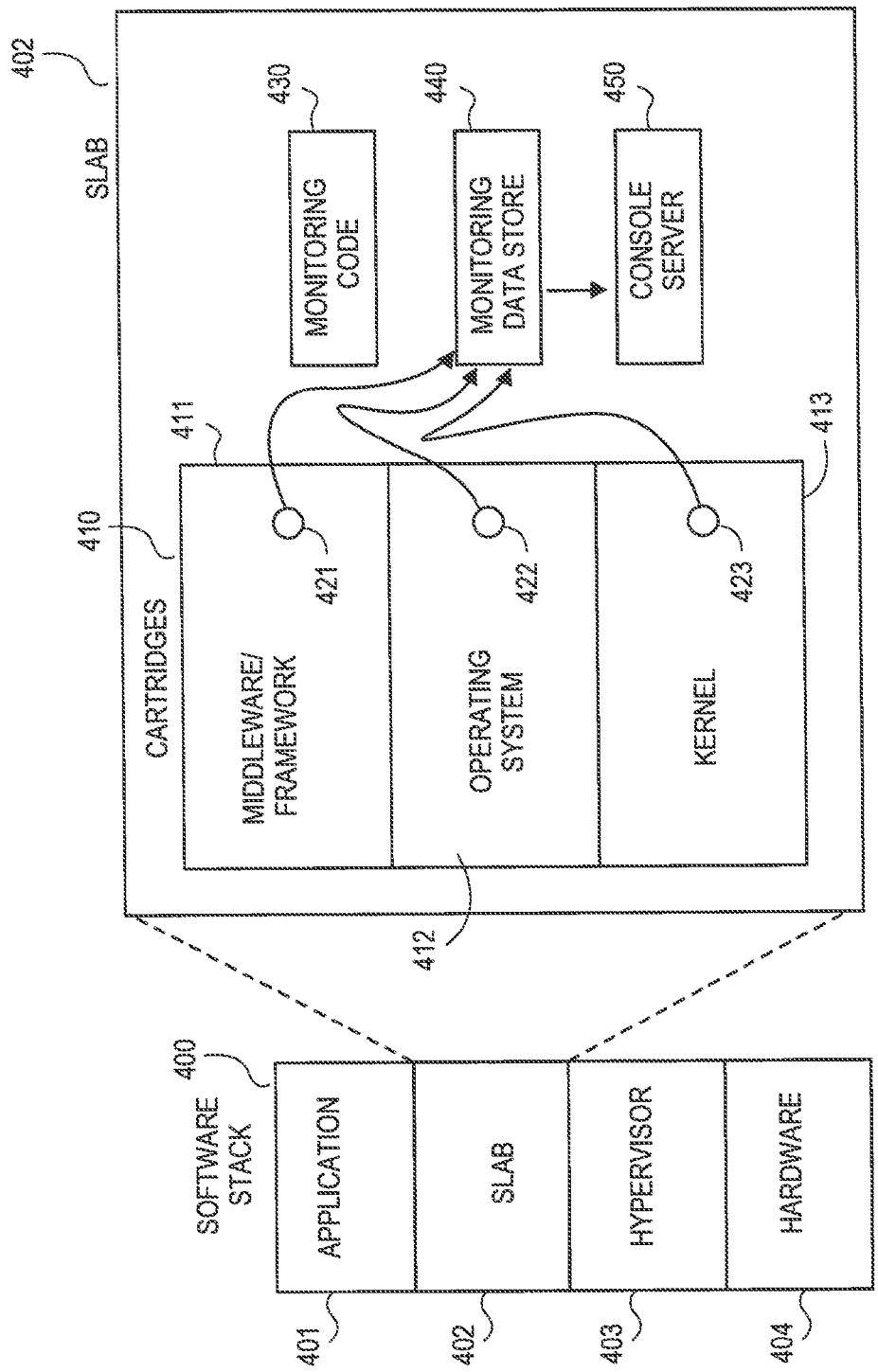
FIG. 4 is a software architecture diagram showing a software stack architecture used by the facility in some embodiments.

FIG. 4 is a software architecture diagram showing a software stack architecture used by the facility in some embodiments. The figure shows a software stack 400 in which the application executes. The application 401 runs on top of a slab 402. The slab in turn runs on top of a hypervisor 403. In various embodiments, a hypervisor can include such hypervisors as VMware Workstation, VMware ESX, Microsoft Hyper-V, VirtualBox, Parallels Workstation, and Xen. The hypervisor executes on hardware 404, such as hardware of a data center provider, or any other physical computer system capable of supporting execution of a hypervisor.

It can further be seen that the slab contains a number of support software components—sometimes called "cartridges"—that have been selected by the facility based upon dependencies of the application. Here, these components include one or more middleware/framework components 411, an operating system component 412, and a kernel component 413. In various embodiments, the middleware/framework components can include such components as Java, Flex, PHP, JBoss, and Tomcat. The middleware/framework components are discussed in greater detail below in connection with FIGS. 5 and 6. In various embodiments, the operating system components can include such components as Linux, OpenBSD, Microsoft Windows 7, Microsoft Windows Server, etc. In various embodiments, the kernel components can include, for example kernels shipped with or otherwise supporting the above list of operating systems, or a variety of other kernels.

In various embodiments, one or more of the cartridges contained in the slab includes instrumentation, such as instrumentation 421, 422, and/or 423. Such instrumentation also referred to as a probe is a piece of code that generates monitoring data that can (1) directly describe the behavior and measure the performance of the instrumented component(s), and/or (2) indirectly describe the behavior and measure the performance of other components of the slab, elements of hardware, and ultimately the application. Monitoring code 430 present in the slab receives the monitoring information from the instrumentation in instrumented components and stores this monitoring data in the monitoring data store 440 within the slab. In some embodiments, as part of storing the monitoring data, this monitoring code performs one or more of analyzing the monitoring data, matching related portions of the monitoring data, compressing the monitoring data, and aggregating and/or abstracting the monitoring data.

In some embodiments, where the same application is running on multiple virtual machines, such as virtual machines or "nodes" in a cluster, instead or in addition to storing the monitoring data generated by the execution of the application in a particular virtual machine in the monitoring data store that is within the slab on the same virtual machine, the facility exports the monitoring data to a designated virtual machine within the cluster, in whose monitoring data store the facility stores the monitoring data produced by all of the virtual machines in a cluster.

After the monitoring data has been stored in the monitoring data store, a console server 450 provided by the facility can access the stored monitoring data in order to report on the execution of the application.

Figure 5:
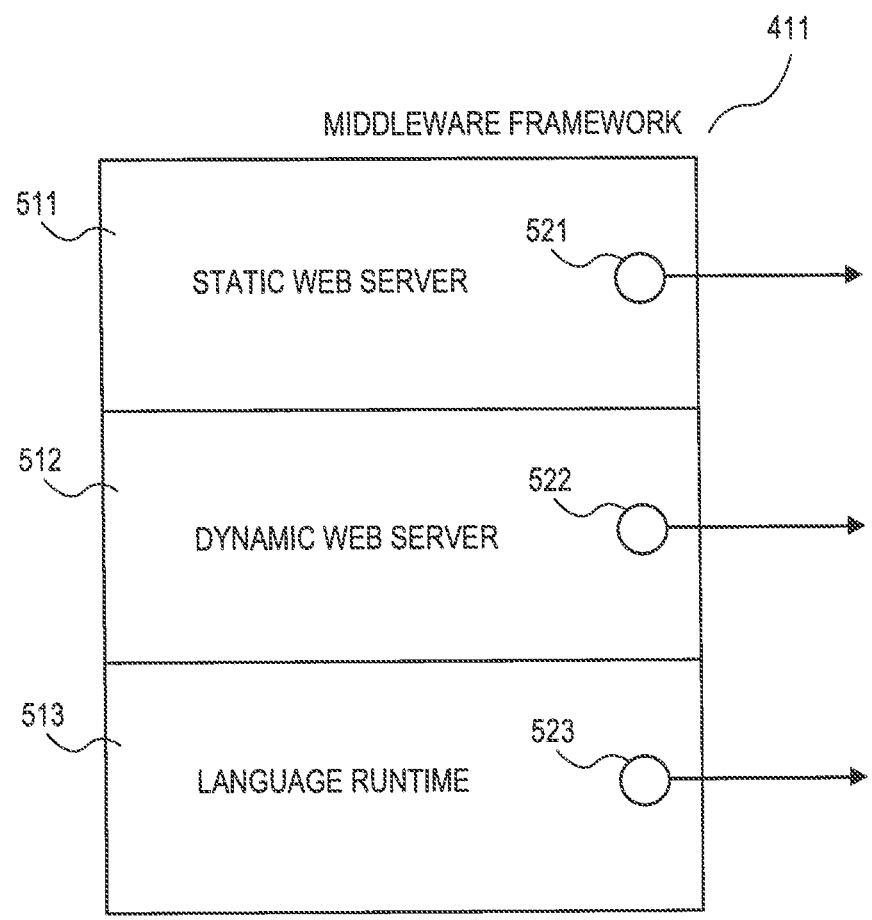
FIG. 5 is a software architecture diagram showing middleware/framework components included by the facility in a slab in some embodiments.
Figure 6A:
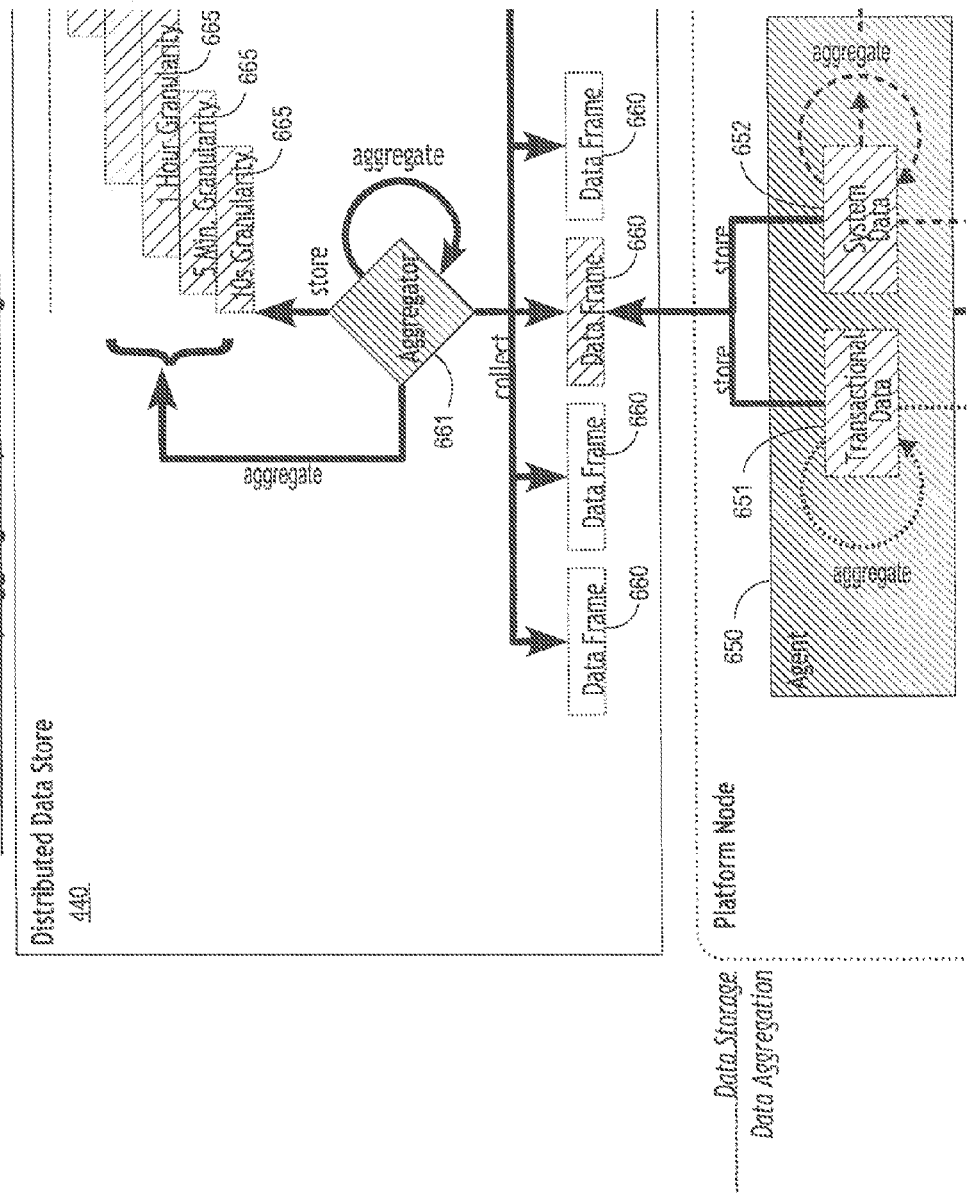
FIG. 6 is a data flow diagram showing the monitoring data produced by the instrumentation and captured by the facility.
Figure 6B:
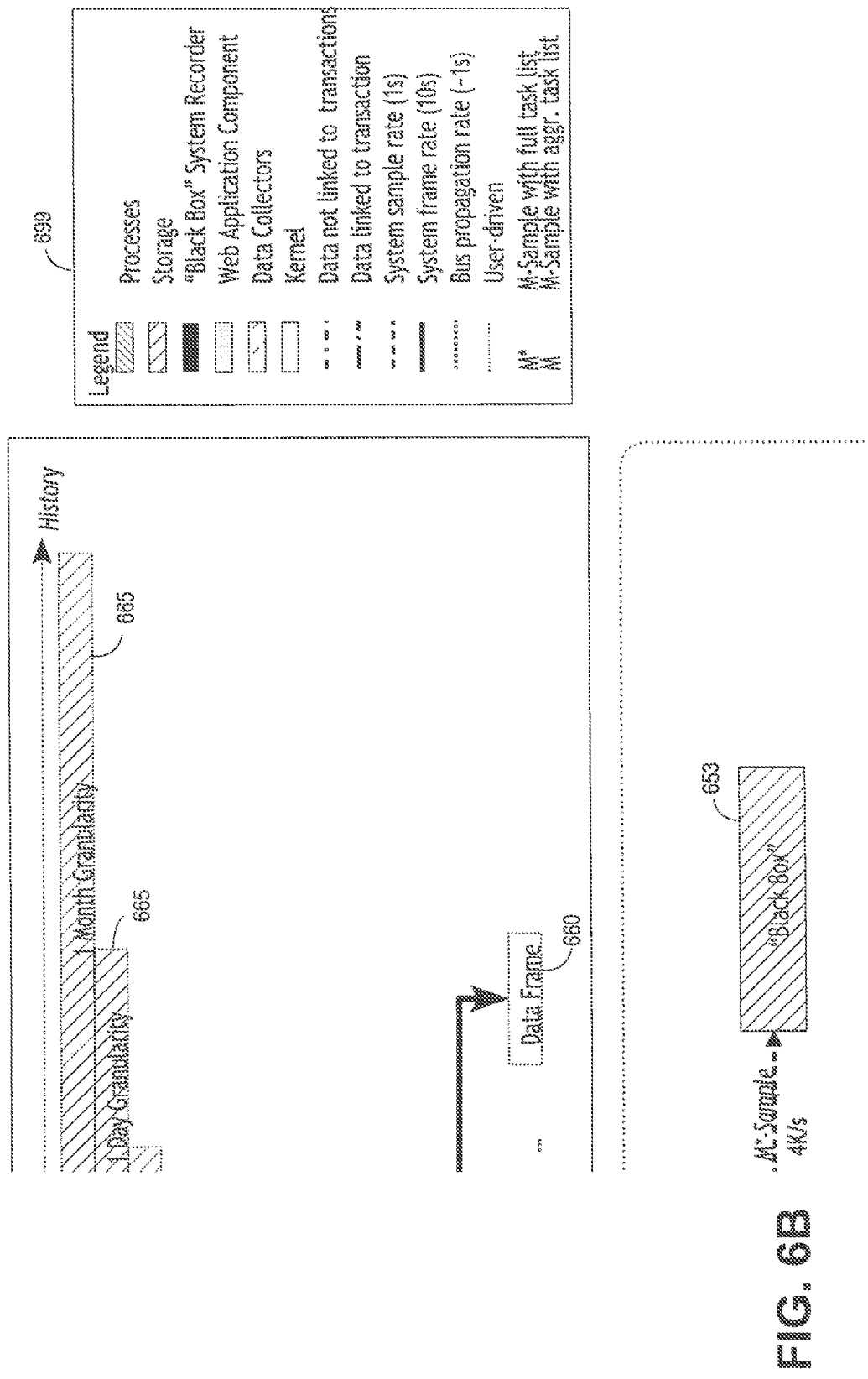
Figure 6C:
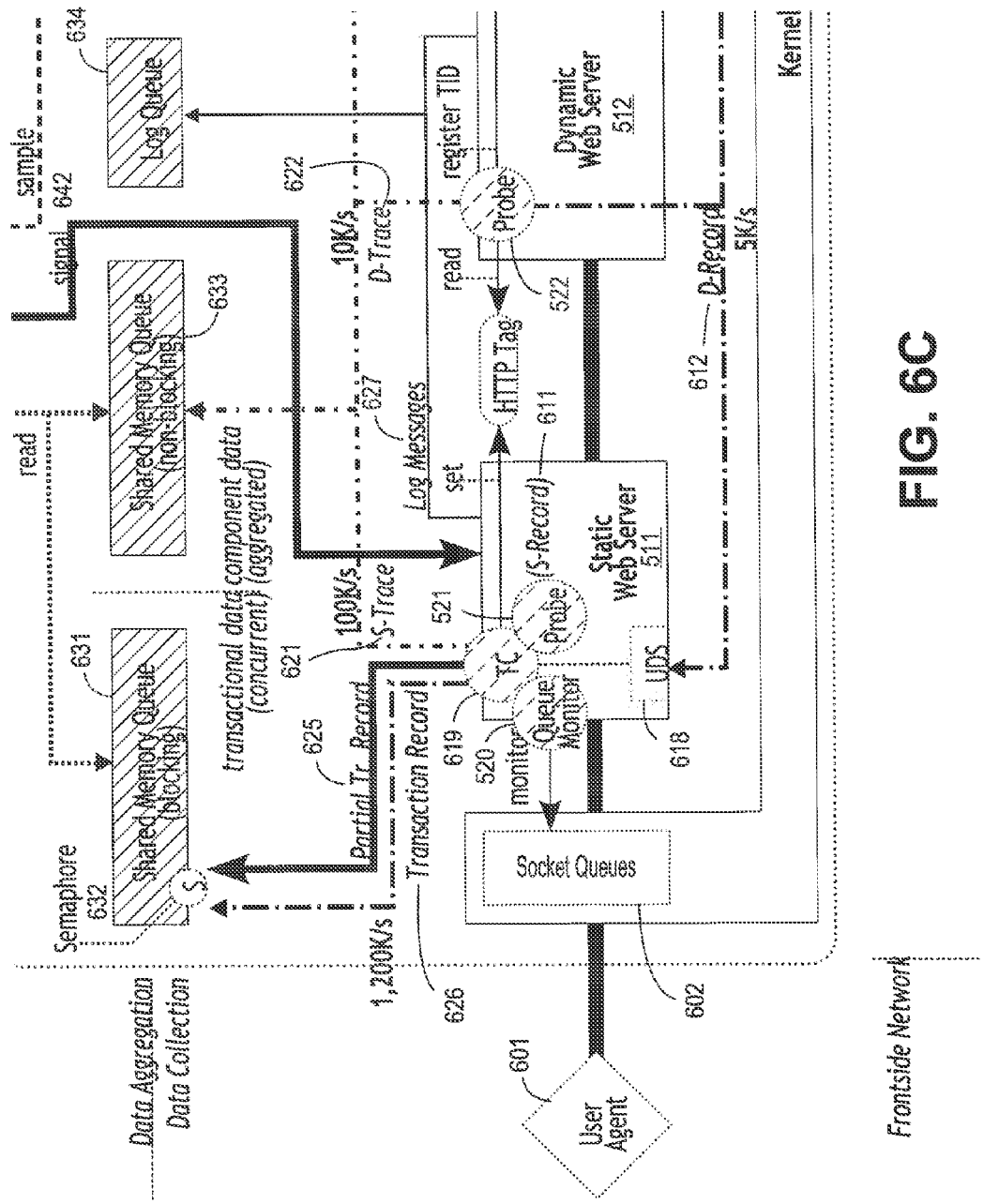
Figure 6D:
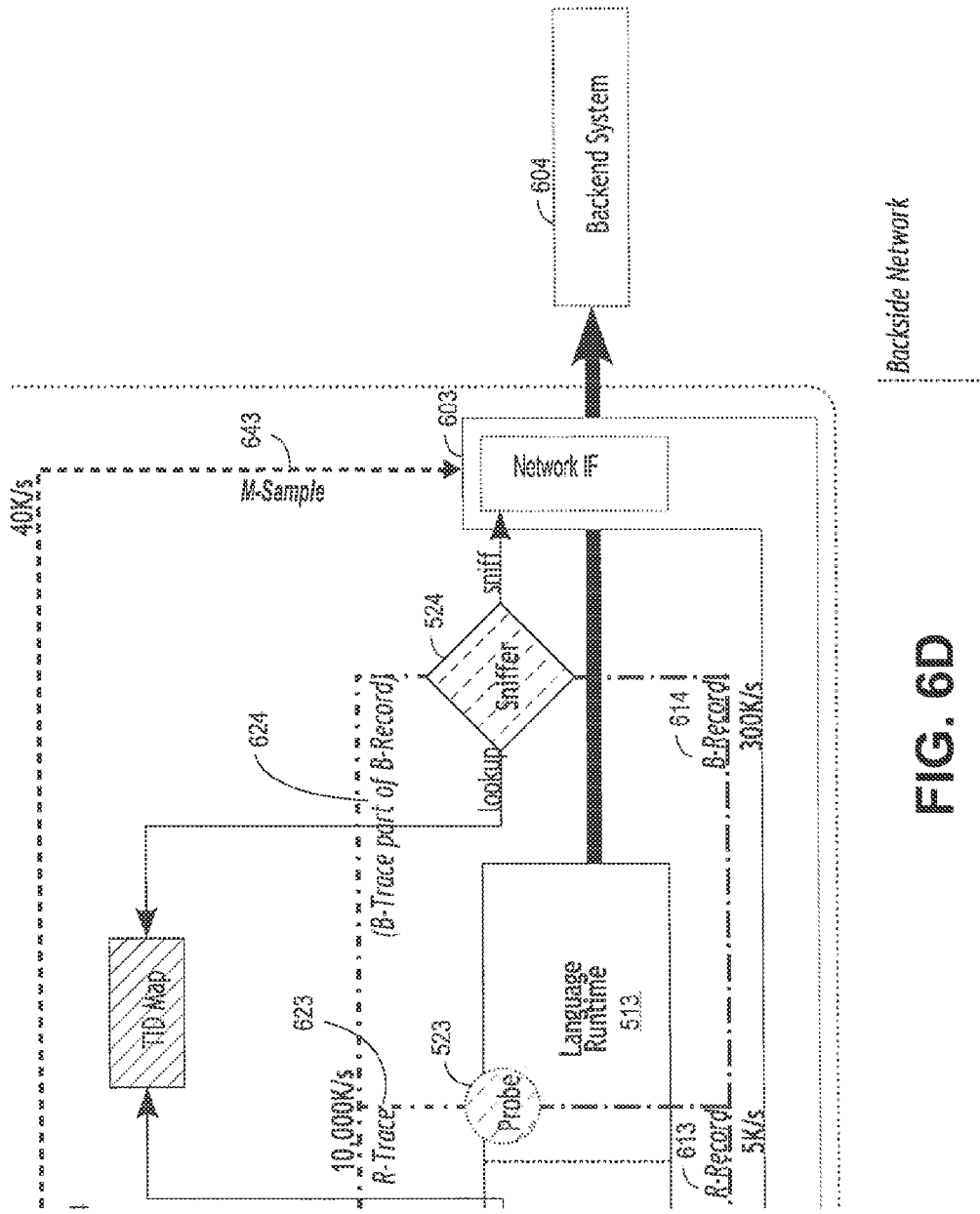

FIG. 5 is a software architecture diagram showing middleware/framework components included by the facility in a slab in some embodiments. These middleware/framework components 411 include a static web server component 511, such as Apache; a dynamic web server component 512, such as TomCat or JBoss; and a language runtime component 513, such as Java, PHP, Ruby, or Spring. The diagram shows each of these middleware/framework components being instrumented with instrumentation 521, 522, and 523, respectively. In various embodiments, various other components are included (not shown), such as databases, message queues, caches, and asynchronous workload managers.

FIG. 6 is a data flow diagram showing the monitoring data produced by the instrumentation and captured by the facility. A legend 699 helps to identify various aspects of the data flow diagram 600.

Monitoring data collection is driven by user transactions. As user agents 601 (browsers, clients, etc.) issue requests against the application, the kernel 423 creates a TCP connection, allocates a queue 602 for the TCP socket, and then starts receiving packets with data. At the same time, the listening process is notified that data is available and the listening process starts reading from the queue.

Once a request is read in enough to become actionable, the listening static web server 511 will either start serving a static file (if the request in question is a "static file" request) or pass the request along to a dynamic content server 512 (if it is a "page" or "dynamic" request), which is running the application language runtime 513 (e.g., Java or PHP). Once the dynamic server is done parsing and processing the request at the HTTP level, it passes it on to the application runtime which in turn passes it on to the application (not shown).

While running, the application will typically issue a number of data backend requests, some to databases, others to web services or other servers or other backend systems 604. These backend transactions take place over the backend network 603 (including the localhost pseudo interface). Once the backend service is done, it returns to the dynamic server.

The dynamic server finishes up processing and returns the response to the static server. Likewise, the static server finishes up any processing left to do and returns the response to the user agent. At this point the transaction—which comprises a request-response pair—completes. Transactions can be either static transactions or dynamic transactions. Dynamic transactions can potentially make any number of backend requests that result in backend transactions.

The path that a transaction takes through the system is described as being divided accordingly into 5 "components": the frontside network (F), the static (S) and dynamic (D) web servers, the language runtime (R), and the backside network (B). Each "component" is monitored by "probes" established in accordance with the facility: the frontside network is monitored by a "Queue Monitor" 520 monitoring the frontside network queue of the transaction in process. This "probe" is implemented in-process in the static web server, just as the proper static server probe 521, which monitors the static server's execution.

Execution of the dynamic server (e.g., Apache or Tomcat or JBoss) is monitored by a similar in-process probe 522, as is the runtime execution by another similar probe 523. The backside network is monitored by an independent "sniffer" process 524 that follows TCP connections between any application running and any backend server. The sniffer also reassembles and monitors the datastream on connections to "known" backends such as MySQL databases and HTTP-based servers (web applications, web services, XML RPCs, etc.).

Probes create records and traces. In some embodiments, they do this by running in-process with the transaction processing thread. For example, for Apache and PHP, probes are compiled into the component software. For Java, the probe is loaded into the JVM using the native JVM instrumentation interface (JMX).

In some embodiments, probes are inserted by instrumenting C library read and write calls directly. The sniffer is an exception in that, as a backside network transaction monitor, it is out-of-process (there is no process), as is the Queue Monitor, which, as the frontside network transaction monitor, is removed from the kernel—it runs in-process with the transaction-serving thread within the static server. Finally, the code mining system performance data from the kernel could be seen as a "probe", although in some embodiments it simply collects well-publicized data from the kernel.

During monitoring, data may be collected at two levels: a) performance and resource usage data at the high level (overall execution time, etc.), and b) performance and resource usage data at a lower level such as individual handlers in Apache or methods/functions in the language. High-level data is linked to the transaction generating it whereas low-level data is generated without a link to the transaction. High-level data is reported in "Records", whereas low-level data is reported in "Traces". Probes in each component create their own set of "Records" and "Traces", named after their component identifier. That is, the static server generates "S-Records" 611 and "S-Traces" 621; the dynamic server generates D-Records 612 and D-Traces 622; the language runtime generates R-Records 613 and R-Traces 623; the backend generates B-Records 614. The only exception is that, in some embodiments, the sniffer does not actually separately generate "B-Traces" 624 because the contents of a "B-Trace" are such that the facility can create such traces after the fact based on "B-Records".

Since records are linked to transactions, they are all reported together in one big "transaction record" 626. In order to do so, the different components report their records to a central place: a "Transaction Controller (TC)" 619 that is embedded in the static server thread. Since in some embodiments every transaction goes through the static server, placement of the transaction controller in the static server makes sense and saves the additional overhead that would be incurred to run a central server asynchronously. In some embodiments (not shown), however, the facility operates an asynchronous central server for collecting the individual portions of a transaction record. To facilitate this central reporting to the Transaction Controller, the facility creates a Unix Domain Socket (UDS) 618 for dynamic requests and passes the socket name (in the file system) on to the dynamic server for reference via an additional HTTP header. The dynamic server then registers this socalled "Transaction ID" under its own process or thread ID in a "Transaction ID Map" in shared memory. (Since the Transaction ID is an HTTP header, the probe in the language runtime can see it directly, too.)

The sniffer, upon detecting a new backend connection, then looks up the owner of the local socket file descriptor and subsequently uses this thread or process ID to lookup the Transaction ID associated with it. In various embodiments, the facility uses various other approaches to correlate the individual portions of a transaction record received from the various probes. Once all components have their TIDs, they can report their records to the UDS opened by the Transaction Controller.

Since full transaction records have variable length, in some embodiments they are written to a shared memory queue 631 that has its write access serialized by a semaphore 632. Traces on the other hand have constant size and are thus in some embodiments written to a non-blocking queue 633. In some embodiments, such concurrent access takes advantage of a total-memory-barrier afforded by the gcc compiler on i686 and higher processors. Apart from these two queues 631 and 633, the facility uses another shared memory segment 634 to consolidate log messages 627 generated by the static and dynamic web servers.

In some embodiments, to make currently running transactions visible, the agent sends signals 642 to all running components to report their cumulative transactions data 625 for incomplete transactions. These incomplete transaction records are collected by the TC just as completed transaction records 626, but then reported with a special "PARTIAL" flag set so they can be discarded once the full record has been received.

On the reading side of the shared memory segments is an "agent" daemon 650 that reads data 651 in the form of data frames 660 from the queues as well as samples 643, 652 received from the system (kernel). Aggregator 661 aggregates or averages the data frames 660, then stores this aggregated data in the data store 440. In some embodiments, the facility stores higher-granularity system data in a node-local "black-box" 653 for post-mortem analysis.

Once aggregated/averaged, the data monitoring is distributed across the cluster and data from all nodes in the cluster are combined into buckets at the highest level of granularity supported by the system, such as 10 seconds. In one embodiment, a "blob" is created every 10 seconds. After some time, the facility asynchronously combines a number of these blobs into less granular blobs 665, and so forth. In various embodiments, the facility supports levels of granularity at level such as 10 seconds, five minutes, one hour, one day, and one month, as well as one level at zero granularity representing infinity.

The facility serves this data via data points that are served up by a data server running an embedded query executor, which in turn is queried by users through the console server that is running on the node.

FIGS. 7A-7D are data structure diagrams showing schemas for each of several types of monitoring data captured or otherwise used by the facility in some embodiments. Each rectangle shown in the diagrams of FIGS. 7A-7D corresponds to a different type of data item used by the facility, and identifies the different pieces of data included in the data item.

In its upper-right-hand corner, each rectangle indicates the size or range of sizes for the data item, such as invite. Immediately below, each rectangle indicates the number of instances of the data item that are typically generated in a particular period of time—such as 10 seconds—in some embodiments. In some cases, for the data items that are of variable size, the rectangle contains a lower portion showing the breakdown of how space is consumed inside the data item at its minimum and maximum sizes.

Figure 7B:
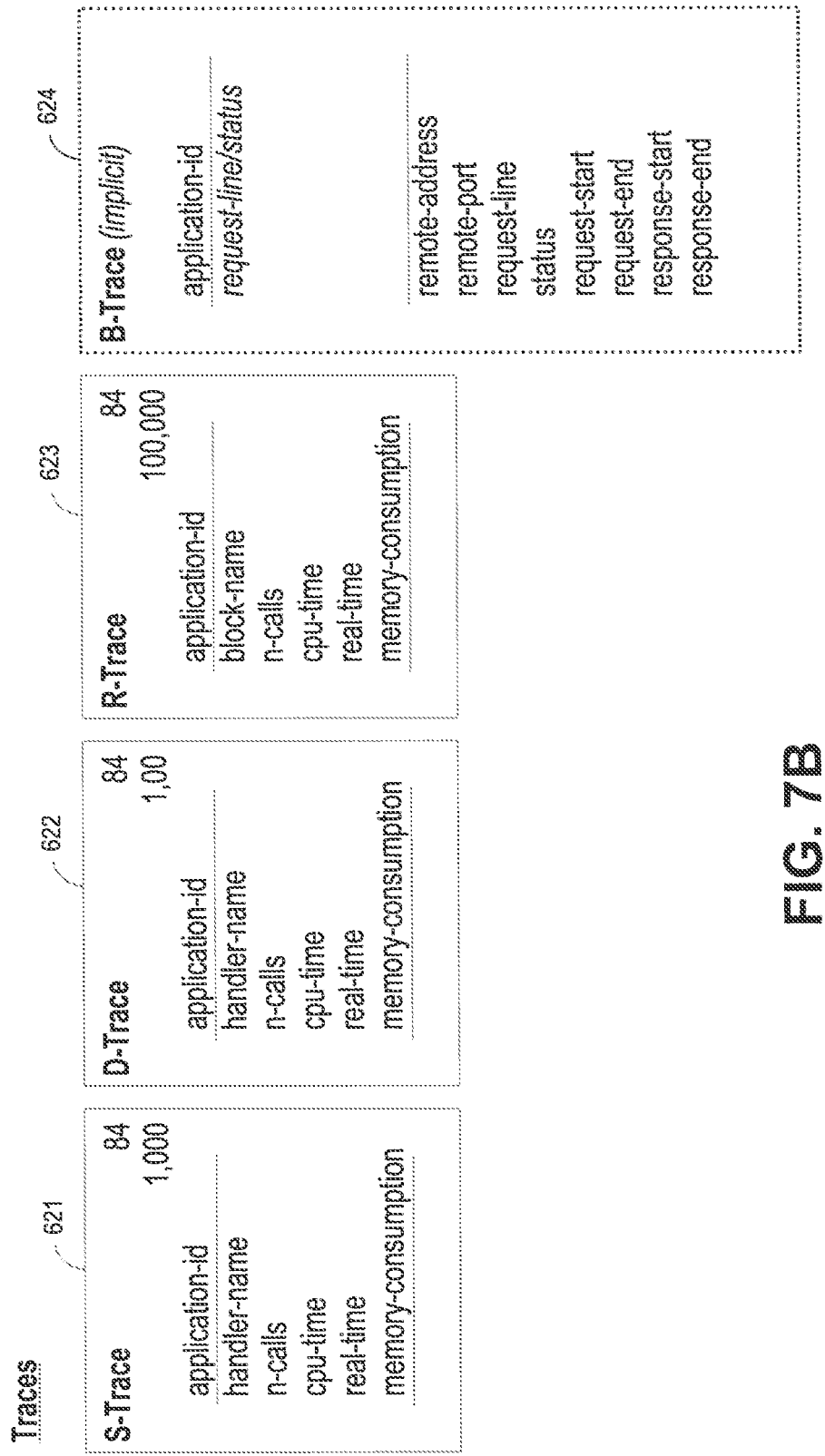
Figure 7C:
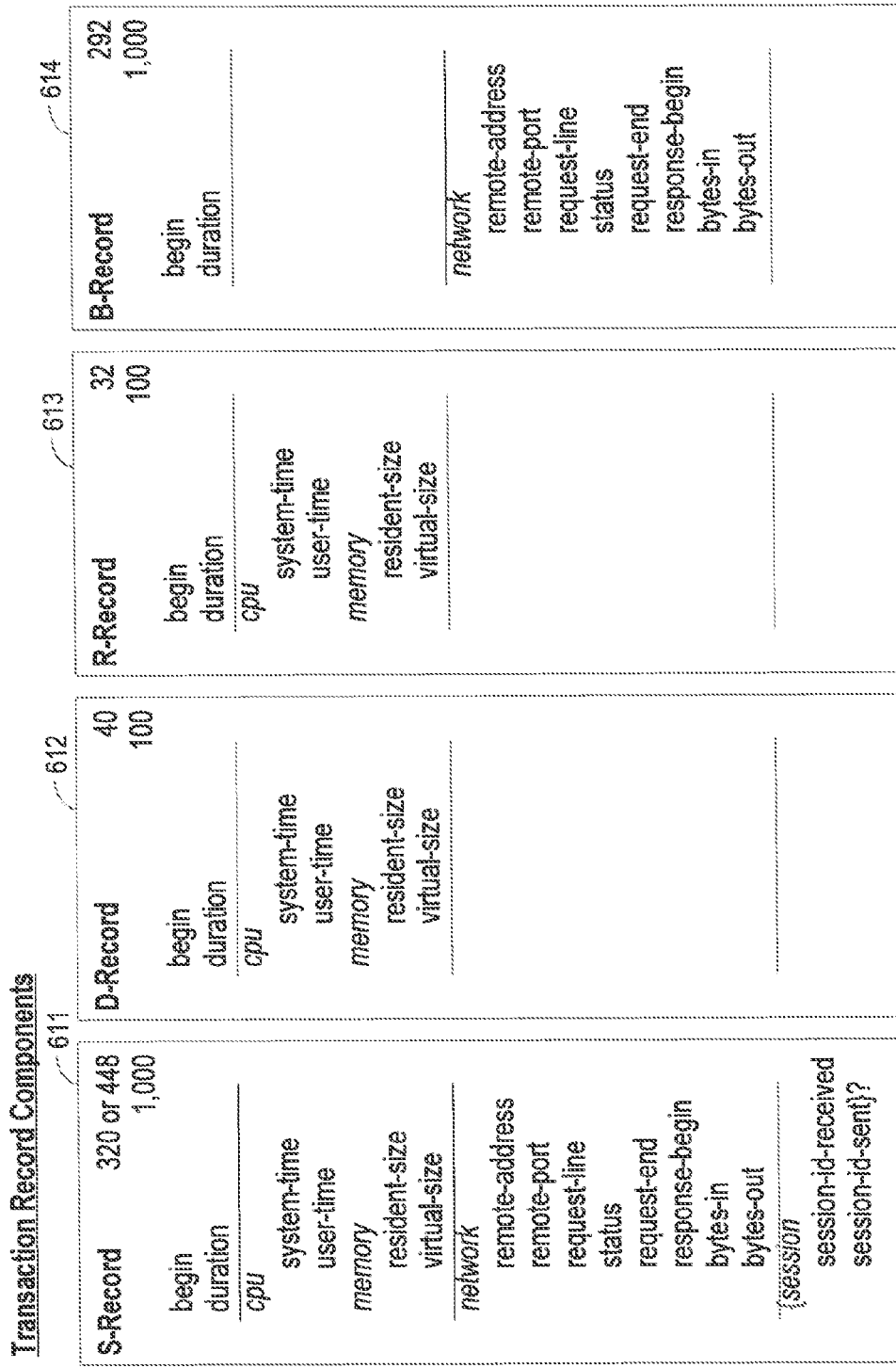

S-Trace 621, D-Trace 622, and R-Trace 623, illustrated in FIG. 7B, are generated by the static web server component 511, the dynamic web server component 512, and the language runtime component 513, respectively. The facility determines the B-Trace 624, illustrated in FIG. 7B, from the BRecord in the agent 650. The facility generates M-Sample 643 and M*-Sample 644, illsutrated in FIG. 7D, in the agent based upon observing the kernel 423. The M-Sample 643 and M*-Sample each contain a K-Sample 701, illustrated in FIG. 7D. S-Record 611, D-Record 612, R-Record 613, and B-Record 614, illustrated in FIG. 7C, are generated by the static web server component 511, the dynamic web server component 512, the language runtime component 513, and the sniffer 524, respectively. X-Record (D) 626*a*, illustrated in FIG. 7A, is a complete or incomplete transaction record for a dynamic transaction, that is, a transaction that the static web server forwards to the dynamic web server for processing. X-Record (S) 626*b*, illustrated in FIG. 7A, is a complete or incomplete transaction record for a static transaction, that is, a transaction that is fully processed by the static web server and not forwarded to the dynamic web server.

Figure 7E:
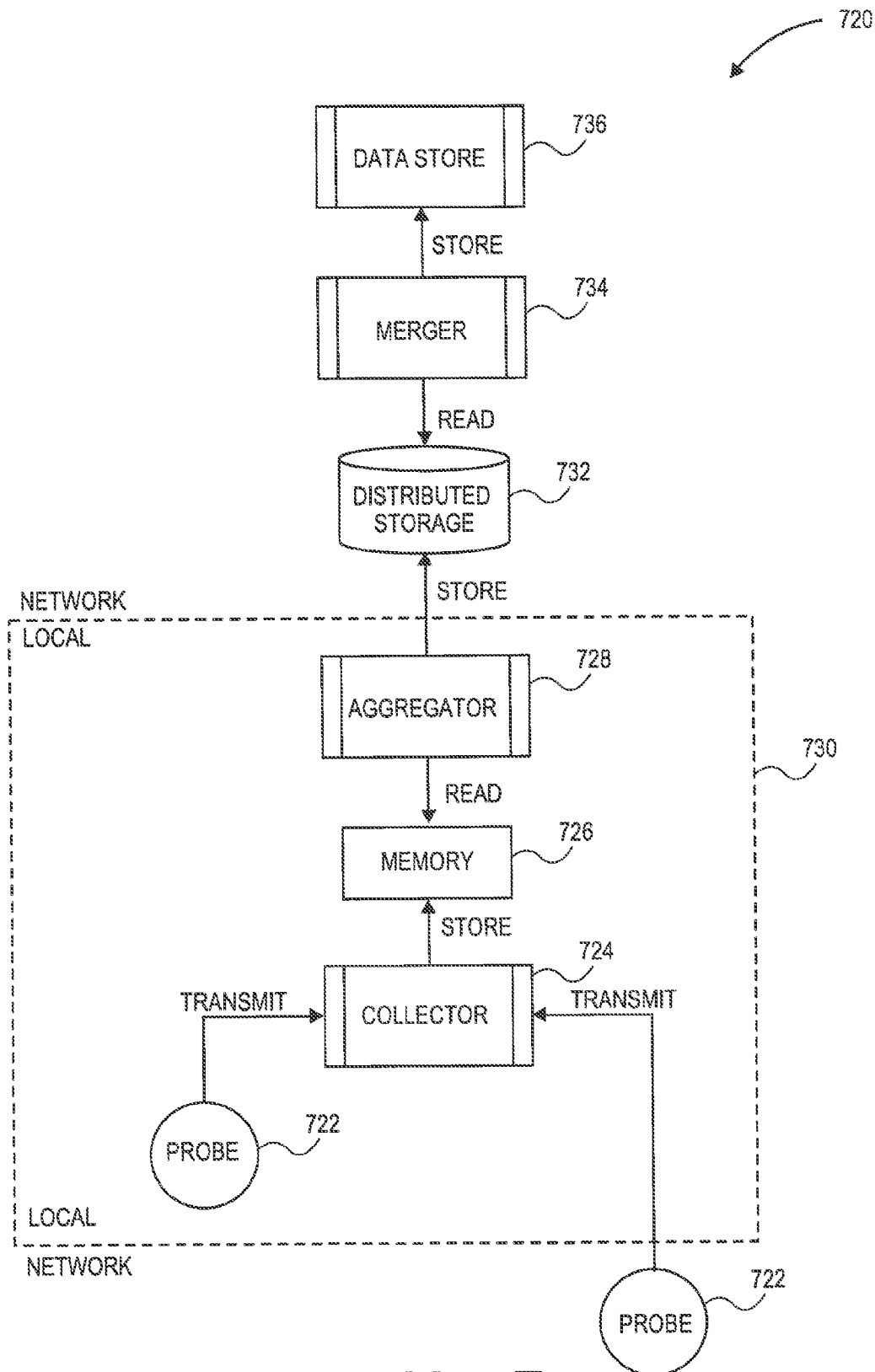
FIG. 7E is a flow diagram illustrating capturing and storing of monitoring data produced during the execution of an application, in accordance with some embodiments.

FIG. 7E is a flow diagram illustrating a process 720 for capturing and storing of monitoring data produced during the execution of an application, in accordance with some embodiments. On each local node, probes 722 generate monitoring data and transmit it to a collector 724. In addition, collector 724 may receive, via a network, data generated by probes on other nodes. Collector 724 stores the collected data in memory 726.

Aggregator 728 reads data from memory 728, aggregates it into time buckets ands stores it as data frames in a distributed data store 732. As time passes, merger 734 merges these data frames across the cluster using larger time intervals and stores the results in data store 736. These results can then be queried based on such metrics as transaction ID, time, performance, etc.

Figure 8:
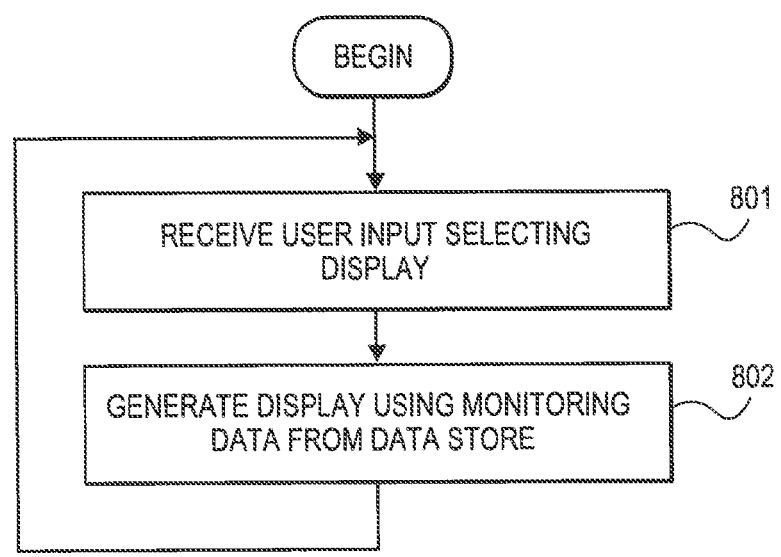
FIG. 8 is a flow diagram of one embodiment of a method for reporting on monitoring data collected during the execution of an application.

FIG. 8 is a flow diagram of one embodiment of a method for reporting on monitoring data collected during the execution of an application. The method is performed by processing logic that may comprise hardware (circuitry, dedicated logic, etc.), software (such as is run on a general purpose computer system or a dedicated machine), or a combination of both. In one embodiment, the method is performed by a host 110, 120 of FIG. 1.

At block 801, the host receives user input selecting a display to be presented. At block 802, the host generates the display selected at block 801 using monitoring data retrieved from the data store. After block 802, the host returns to step 801 to receive the next user input.

Figure 9:
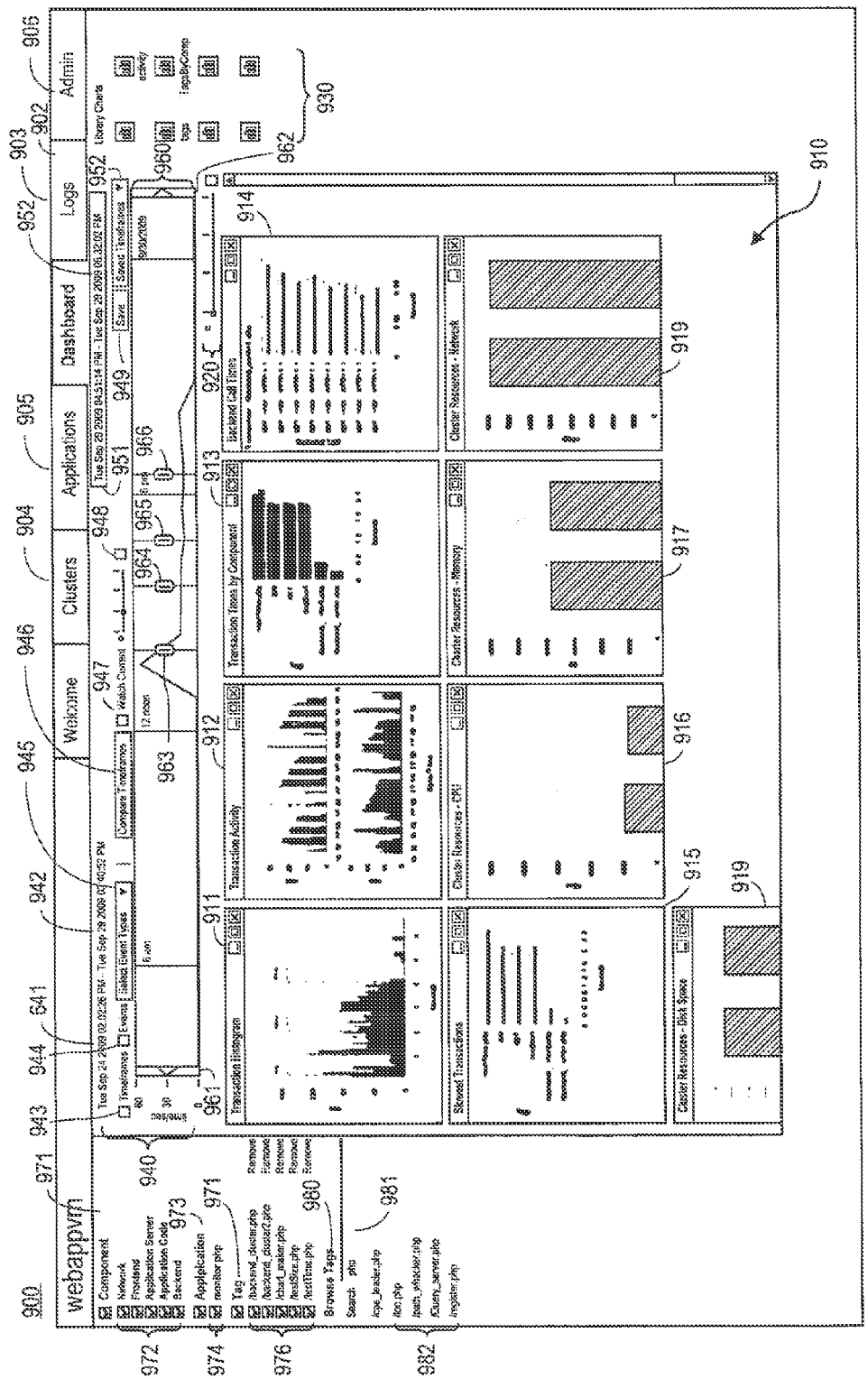
FIG. 9 is an exemplary Dashboard user interface presented by the facility in some embodiments.
Figure 10:
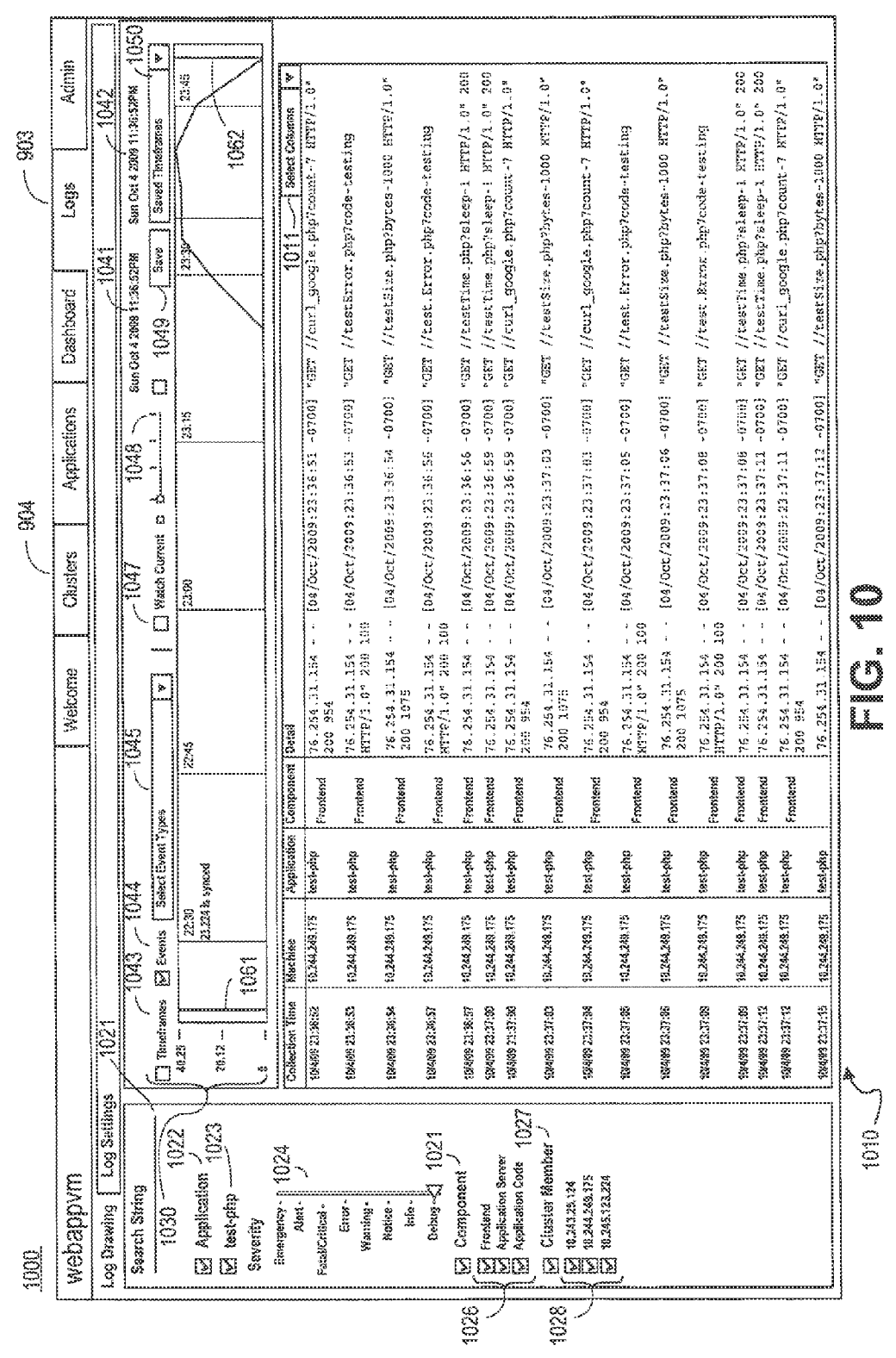

FIGS. 9-11 are exemplary user interfaces showing display screens presented by the facility in accordance with FIG. 8 in some embodiments.

FIG. 9 illustrates an exemplary Dashboard user interface (UI) presented by the facility in some embodiments. The Dashboard UI 900 enables the user to view useful aggregated information about the execution of the application. It includes a set of tabs 901 that the user may select to cause the facility to present different displays. These include a selected tab 902 for the Dashboard display, a tab 903 for a Logs display, a tab 904 for a Clusters display, a tab 905 for an Applications display, and a tab 906 for an Admin display. The dashboard display includes a charts area 910 containing a number of different charts each conveying a different aspect of the monitoring data produced by an application. The shown charts include a Transaction Histogram chart 911 that shows, for each of a different member of amount of time, the number of transactions that took that amount of time to complete; a Transaction activity chart 912 that shows, for each of a number of different times of day, the number of transactions received and/or service at that time; a Transaction Times By Component chart 913 that shows an average amount of time spent on a transaction in each of a number of components; a Backend Call Times chart 914 that shows, for each of a number of different backend calls, the average amount of time they took to complete; a Slowest Transactions chart 915 that shows, for each of a number of transactions that took the longest time, the amount of time that the transaction took to complete; a Cluster Resources-CPU chart 1016 that shows processor utilization on each virtual machine of the cluster; a Cluster Resources-Memory chart 917 that shows memory utilization on each virtual machine of the cluster; a Cluster Resources-Network chart 919 that shows network bandwidth utilization on each virtual machine of the cluster; and a Cluster Resources-Disk Space chart 919 that shows disk space utilization on each virtual machine of the cluster.

It should be noted that the reports shown are merely illustrative, and in various embodiments, the facility provides various additional kinds of charts. The display further includes a chart scale control 920 for configuring the size of each of the charts shown in the charts area. The display further includes a menu 930 of additional charts that can be selected for inclusion in the charts area.

The display further includes a time filtering control region 940 that the user can manipulate in order to control the time interval or intervals for which monitoring data is incorporated into the displayed charts. The beginning time 941 and end time 942 of a first time interval shown on the timeline in orange are displayed in the time filtering control region, as are the beginning time 951 and end time 952 of a second time interval shown on the timeline in green. Data for these intervals is displayed separately using orange and green bars, respectively, in charts 911-915, allowing the user to compare the performance of the application during these two intervals.

Interval definition handles 963 and 964 may be used to adjust the beginning and/or end time for the first time interval, while interval definition handles 955 and 966 can be used to adjust the beginning and/or and time of the second interval. The display includes checkboxes 943 for time frames and 944 for events. The display includes a pulldown list control 945 to select event types to include in the charts, and control 946 to compare time frames. The display includes a watch current checkbox 947 and a scale control 940 that the user can adjust in order to display the timeline at different levels of magnification.

The display includes a save button 949 and a saved timeframes list control 950. The timeline itself includes navigation controls 961 and 962 that the user may select in order to scroll the displayed range of times. The display also includes a component section 971, in which the user can select for which of components 972 data is included in the displayed charts. The display further includes an application section 973 in which the user can select for which applications 974 data is included in the displayed charts. The display further includes a tag section 975 in which the user can select for which of tags 976 data is included in the displayed charts. The display also includes a browse tag section 980. The user can enter a tag query and feel 91, the facility displays tags 982 satisfying the tag query. In order to review a Logs display, the user selects Logs tab 903.

FIG. 10 is an exemplary Logs UI presented by the facility in some embodiments. The Logs display 1000 enables the user to review individual log entries generated while executing the application. It includes a list content of log entries. The user can use a select columns drop-down list control 1011 in order to select the columns that are displayed for each log entry. The display includes a search string field 1021 into which the user can enter a log entry query to filter the list content of one entries to those that satisfy the query.

The display further includes an application section 1022 in which the user can select for which applications 1023 log entries are included in the displayed log entries. The display further includes a severity selection control 1024 that the user may adjust in order to determine the severity of log entries that are to be displayed. The display further includes a component section 1025 in which the user can select the components 1026 for which log entries are to be displayed. The display further includes a cluster member section 1027 in which the user can select virtual machines 1020 among the cluster for which log entries are to be displayed.

The display further includes a time filtering control region 1030 for selecting a time interval 1041 to 1042 for which the display log entries. Time filtering control region 1030 is similar to the time filtering control region 940 shown in FIG. 9 and discussed above. In order to review a Clusters display, the user selects Clusters tab 904.

Figure 11A:
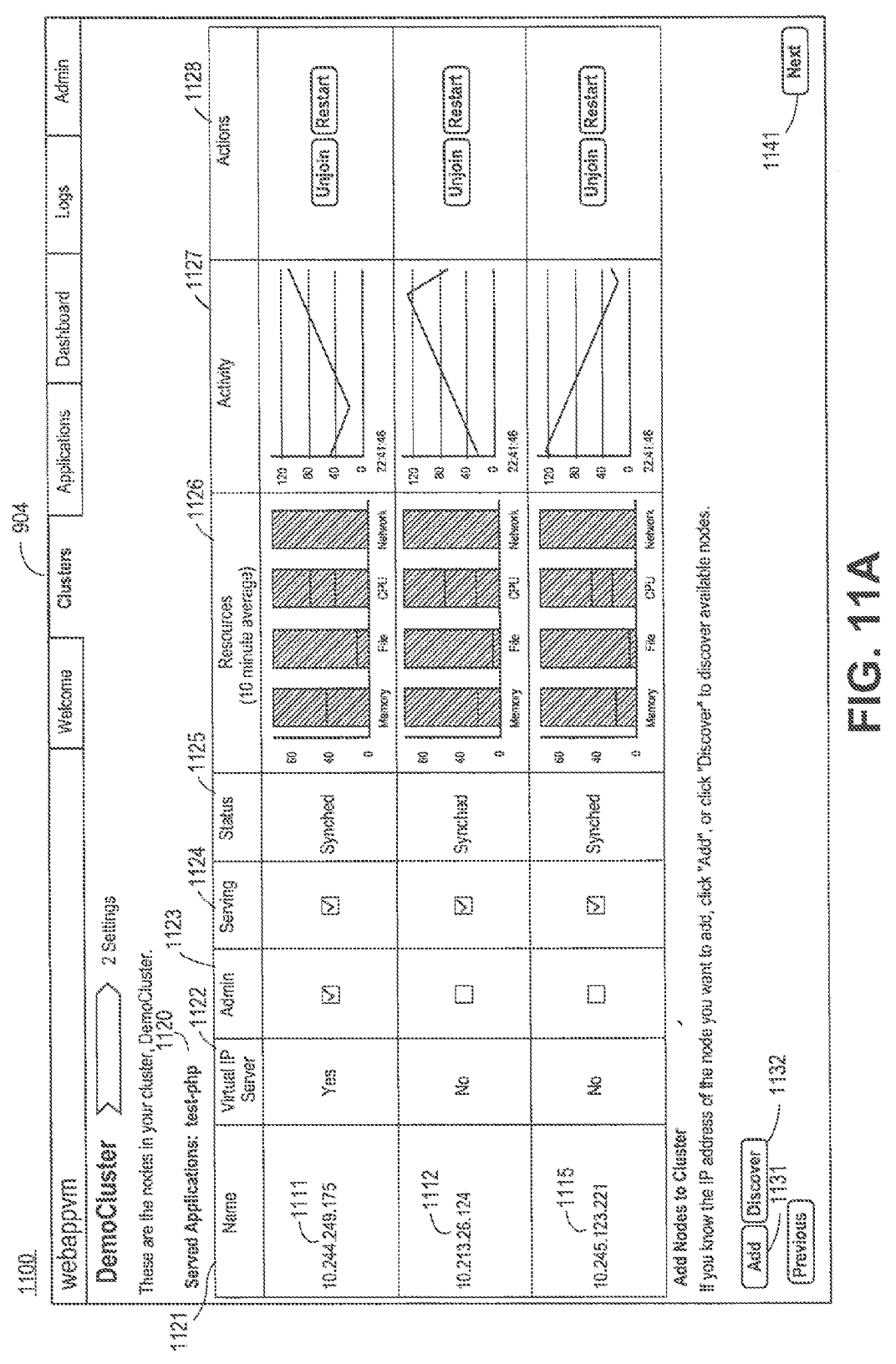

FIG. 11A is an exemplary Clusters UI presented by the facility in some embodiments. The Clusters display 1100 enables the user to review the state of the cluster and administer the cluster. It includes a table 1110 identifying the virtual machines, or "nodes," that are included in the present cluster of nodes and running the application 1120. Each of rows 1111-1113 of the table corresponds to a different node of the cluster. Each row is divided into the following columns: a name column 1121 containing the note's IP address; a virtual IP server column 1122; an Admin column 1123 indicating which of the nodes is the administrative note for the cluster; a serving column 1124 indicating whether the node is currently serving requests for the application; the status column 1125 showing the status of the node in the cluster; an average resources column 1126 showing the average level of each of four kinds of computing resources being consumed on the node; an activity column 1127 showing the level of activity on the node over time, such as level of CPU resources being consumed or number of requests served; and an actions column 1128 containing controls for undermining each node from the cluster, and controls for restarting each node of the cluster. The user may select an add control 1131 to add a node to the cluster where the user knows the node's IP address, or may select a discover control 1132 to discover other nodes that are available to be added to the cluster.

Figure 11B:
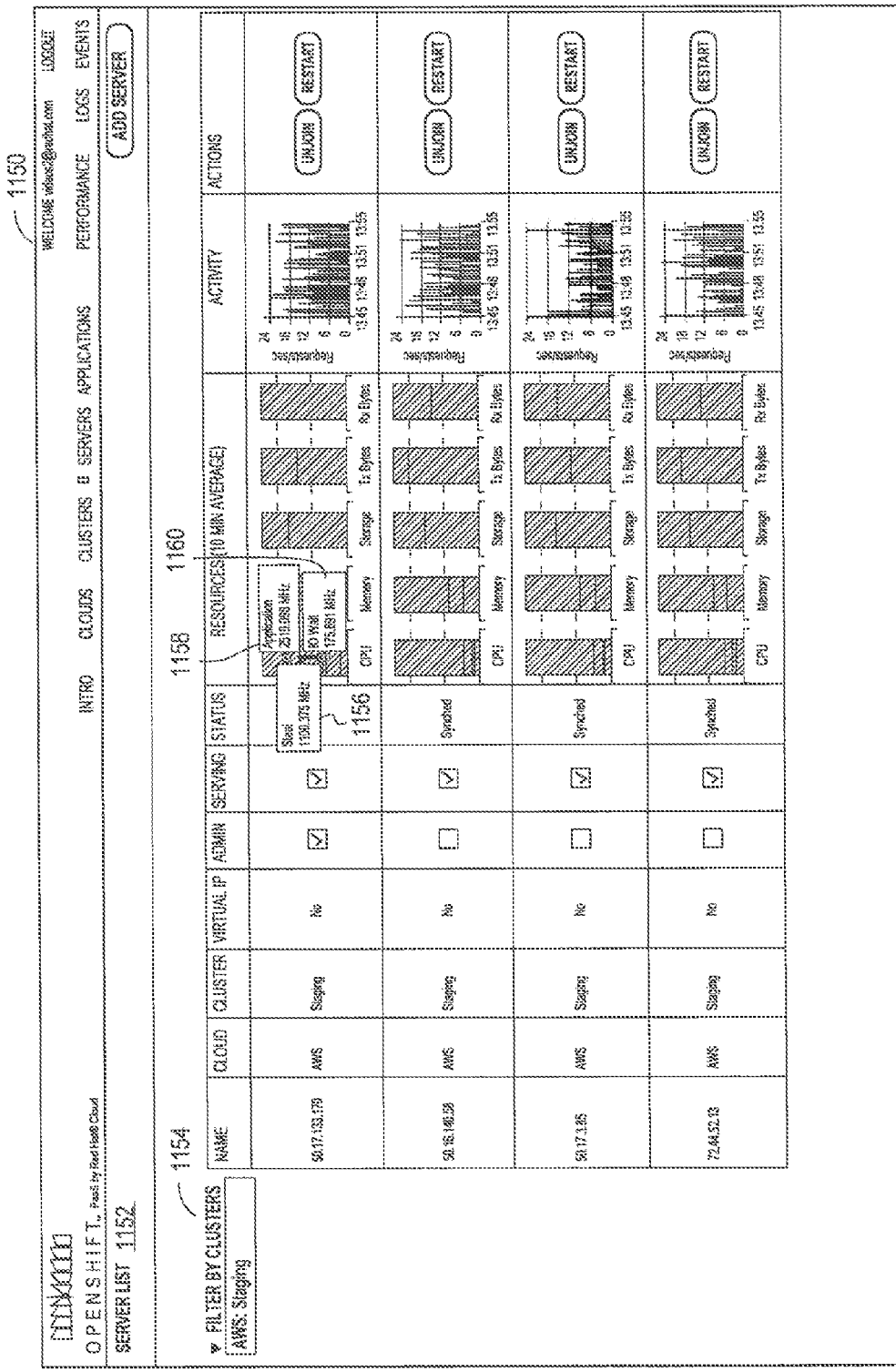
FIG. 11B is an exemplary Servers user interface presented by the facility in some embodiments.

FIG. 11B is an exemplary Servers UI presented by the facility in some embodiments. The Servers display 1150 enables the user to review the list of servers 1152, filter the list by clusters 1154, and review parameters of the servers, which are similar to those of the cluster in FIG. 11A. The user may also be able to view additional parameters 1158, 1160 and 1156 of each server in the list 1152.

Figure 12A:
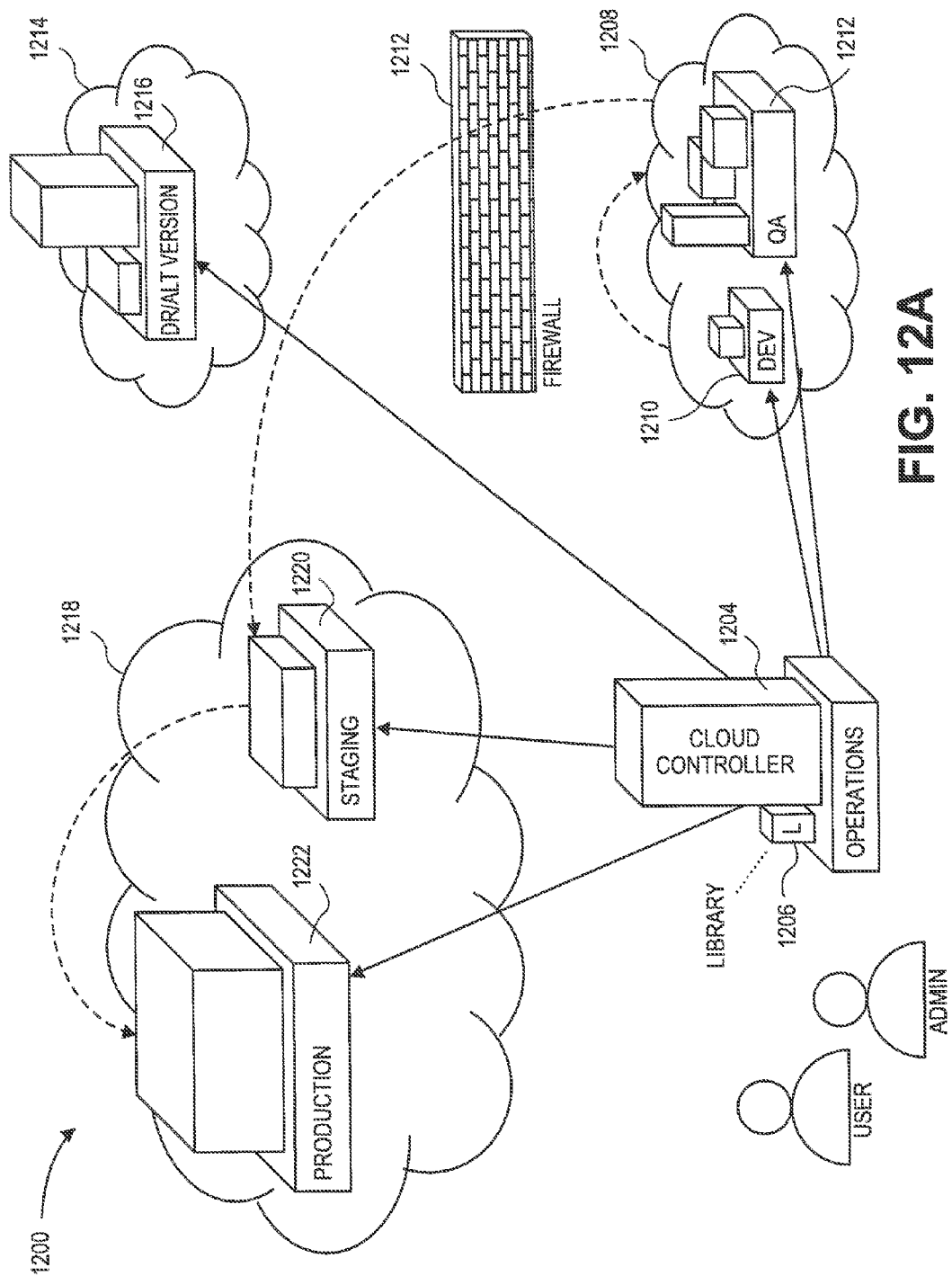
FIG. 12A is a block diagram of one embodiment of a system for executing one or more applications at different stages in their life cycle.

FIG. 12A is a block diagram of several embodiments of the system executing one or more applications at different stages in their life cycle, forming an overall system 1200 for managing applications across different clouds or environments as well as applications' life cycles, such as promoting it from development to production, etc. Cloud controller 1204 maintains a library 1206 that stores different application packages, different cartridges and slab images. The cloud controller 1204 promotes an application to different stages. These stages may include, for example, development 1210, QA 1210, Disaster Recovery or alternate configuration (e.g., localized) (DR/ALT) version 1216, staging 1220 and production 1222. At each stage, the application may need different support software. The cloud controller 1204 may identify dependencies of the application at a specific stage, and identify a set of cartridges corresponding to the dependencies, as discussed above. The cloud controller 1204 may then load a slab instance on a node or cluster of nodes using a slab image stored in the library 1206, select the identified cartridges from the library 1206, and add instances of the selected cartridges to the slab. The cloud controller 1204 will then load the application on the host(s) to run on top of the slab.

Once the development of the application is completed, the cloud controller 1204 may determine whether the QA environment 1212 will result in different dependencies of the application. If not, the cloud controller 1204 will migrate the application to the QA environment 1212 or create an equivalent new node or cluster of nodes to act as QA environment 1212. If the QA environment 1212 results in different dependencies of the application, the cloud controller 1204 will create a new slab instance as discussed above, and load the new slab instance and the application on the node(s) in the QA environment 1212. The cloud controller 1204 will then continue promoting the application to the next stages in a similar manner. Since the platform (the slab) is delivered as a virtual machine, nodes can be instantiated outside or inside the corporate firewall 1212.

In one embodiment, different environments are part of different clouds. For example, the development environment 1210 and the QA environment 1212 may be part of cloud 1208, the DE/Alt Version environment 1216 may be part of cloud 1214, and staging and production environments 1220 and 1222 may be part of the cloud 1218. Each cloud may have a different combination of cloud provider and a hypervisor type on which the application is to be executed. For example, these combinations can include (1) VMware Workstation running in the Rackspace Cloud; (2) VirtualBox running in the Terremark Enterprise Cloud; (3) Xen running on Amazon EC2; and (4) Microsoft Hyper-V running on Microsoft Azure. The application may have different dependencies for various combinations. The cloud controller 1204 addresses these differences by creating a slab for a current combination of cloud provider and hypervisor, and migrates the application to the current combination of cloud provider and hypervisor to execute on the created slab.

Figure 12B:
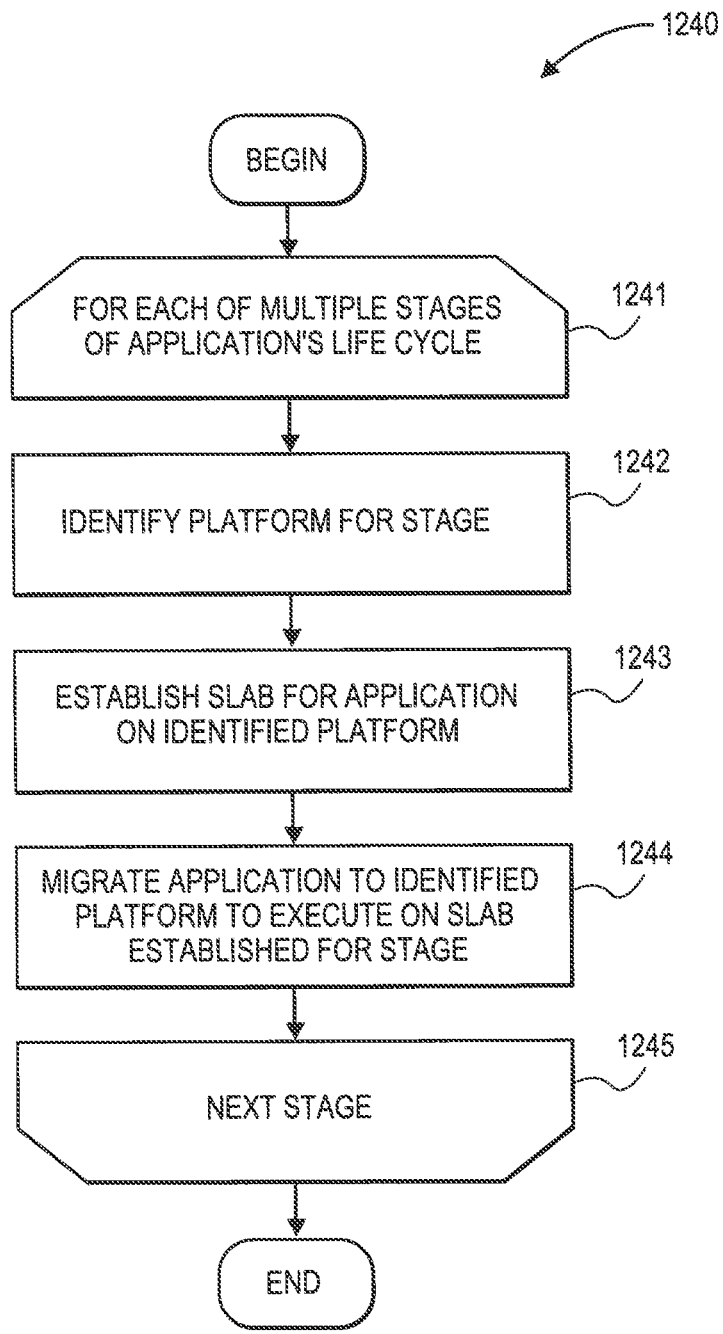
FIG. 12B is a flow diagram of one embodiment of a method for facilitating the execution of an application at different stages in the application's life cycle.
Figure 13:
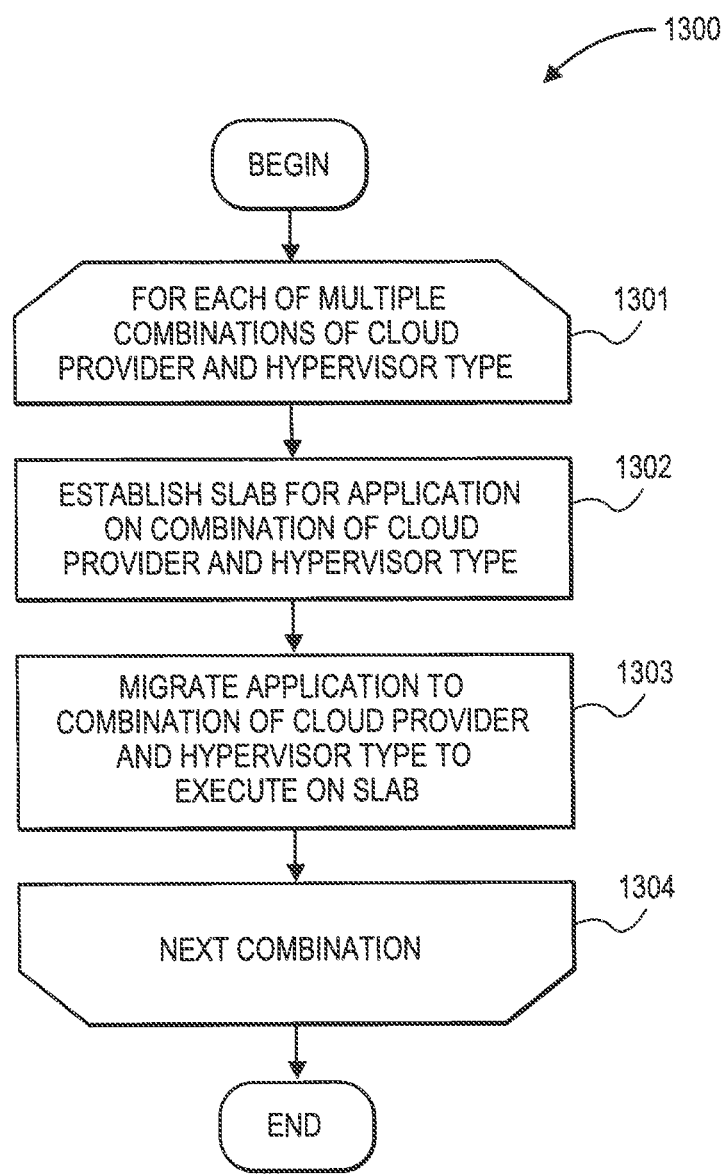
FIG. 13 is a flow diagram of one embodiment of a method for migrating an application to different environments.

FIGS. 12B and 13 are flow diagrams of methods performed by a cloud controller in accordance with some embodiments. The methods are performed by processing logic that may comprise hardware (circuitry, dedicated logic, etc.), software (such as is run on a general purpose computer system or a dedicated machine), or a combination of both.

FIG. 12B is a flow diagram of one embodiment of a method for executing the application at different stages in the application's life cycle. At block 1241, the cloud controller identifies a current stage of the application's life cycle. In various embodiments, these stages can include, for example, development, testing/quality assurance, staging, and production. At block 1202, the cloud controller identifies a platform to be used for the current stage. For example, the platform identified for the development stage may be the VMware Workstation hypervisor running on a laptop computer system; the platform identified for the testing stage may be VMware Workstation running on a desktop computer system; the platform identified for the staging phase may be VMware Workstation running in the Amazon cloud, and the platform identified for the production release may be VMware Workstation running in the Amazon cloud.

At block 1203, the cloud controller provides a slab for the application on the identified platform as discussed above. At block 1204, the cloud controller migrates the application to the identified platform to execute on the slab established on the platform at block 1203 for the stage. At block 1205, if additional stages remain to be handled, then the facility returns to block 1201 to handle the next stage, else method 1240 ends.

FIG. 13 is a flow diagram of one embodiment of a method for migrating an application to different clouds. At block 1310, the cloud controller identifies a current combination of a cloud provider and a hypervisor type on which the application is to be executed. At block 1302, the cloud controller establishes a slab for the application on the current combination of cloud provider and hypervisor as discussed above. At block 1303, the cloud controller migrates the application to the identified combination of cloud provider and hypervisor to execute on the slab established at block 1203 for the combination. In step 1304, if additional combinations remain to be handled, then the cloud controller returns to block 1301 to handle the next combination, else method 1300 ends.

Figure 14:
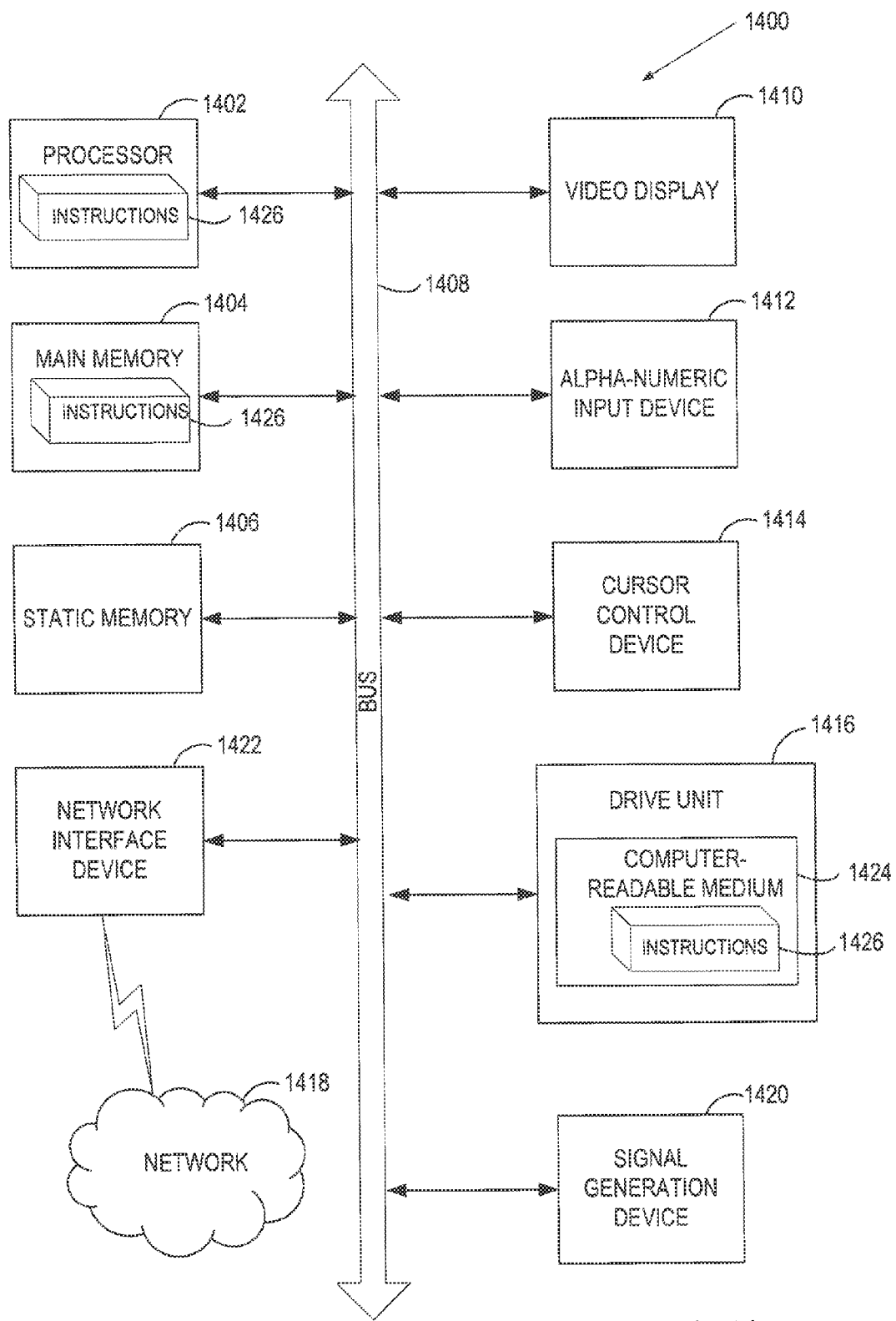
FIG. 14 illustrates a diagrammatic representation of a machine in the exemplary form of a computer system.

FIG. 14 is a diagram of one embodiment of a computer system for facilitating the execution of a web application in a cloud. Within the computer system 1400 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host 110, 120 in a cloud 130, a cloud provider system 104, a cloud controller 108 or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1400 includes a processing device 1402, a main memory 1404 (e.g., read-only memory (ROM), flash memory, dynamic random access memory (DRAM) such as synchronous DRAM (SDRAM) or DRAM (RDRAM), etc.), a static memory 1406 (e.g., flash memory, static random access memory (SRAM), etc.), and a secondary memory 1416 (e.g., a data storage device in the form of a drive unit, which may include fixed or removable computer-readable storage medium), which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. Processing device 1402 is configured to execute the instructions 1426 for performing the operations and steps discussed herein.

The computer system 1400 may further include a network interface device 1422. The computer system 1400 also may include a video display unit 1410 (e.g., a liquid crystal display (LCD) or a cathode ray tube (CRT)) connected to the computer system through a graphics port and graphics chipset, an alphanumeric input device 1412 (e.g., a keyboard), a cursor control device 1414 (e.g., a mouse), and a signal generation device 1420 (e.g., a speaker).

The secondary memory 1416 may include a machine-readable storage medium (or more specifically a computer-readable storage medium) 1424 on which is stored one or more sets of instructions 1426 embodying any one or more of the methodologies or functions described herein. The instructions 1426 may also reside, completely or at least partially, within the main memory 1404 and/or within the processing device 1402 during execution thereof by the computer system 1400, the main memory 1404 and the processing device 1402 also constituting machine-readable storage media. The instructions 1426 may further be transmitted or received over a network 1418 via the network interface device 1422.

The computer-readable storage medium 1424 may also be used to store the instructions 1426 persistently. While the computer-readable storage medium 1424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1426, components and other features described herein can be implemented as discrete hardware components or integrated in the functionality of hardware components such as ASICS, FPGAs, DSPs or similar devices. In addition, the instructions 1426 can be implemented as firmware or functional circuitry within hardware devices. Further, the instructions 1426 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "generating," "performing," "storing," "updating," "implementing," "determining," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for facilitating the execution of a web application in a cloud is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A method comprising:

installing, by a processing device, a web application in a first environment together with a first version of a support package comprising a platform core and a first set of support software components selected for the web application based upon its dependencies, the first environment corresponding to a first life cycle stage of multiple life cycle states of the web application, the first version of the support package being formulated for the first environment;

executing the web application in the first environment together with the first version of the support package;

installing, by the processing device, the web application in a second environment together with a second version of the support package comprising the platform core and a second set of support software components selected for the web application based upon its dependencies, the second environment corresponding to a second life cycle stage of the multiple life cycle states of the web application that succeeds the first life cycle stage of the web application, the second version of the support package being formulated for the second environment; and executing the web application in the second environment together with the second version of the support package.

2. The method of claim 1 wherein the first life cycle stage of the web application is a development stage and the second life cycle stage of the web application is a testing stage.

3. The method of claim 1 wherein the first life cycle stage of the web application is a testing stage and the second life cycle stage of the web application is a staging stage.

4. The method of claim 1 wherein the first life cycle stage of the web application is a data stage and the second life cycle stage of the web application is a production stage.

5. The method of claim 1 wherein installing the web application in the first environment together with the first version of the support package comprises:

identifying dependencies of the web application in the first environment;

identifying the first set of support software components using the dependencies;

loading a slab instance on one or more nodes, wherein the slab instance comprises the platform core;

adding to the slab instance the first version of the support package comprising instances of the identified first set of support software components; and loading the web application on the one or more nodes to run on top of the slab instance.

6. The method of claim 1 wherein executing the web application in the first environment together with the first version of the support package comprises:

collecting monitoring data generated by the first set of support software components during execution, the monitoring data describing the execution of the first set of support software components;

aggregating the monitoring data based on at least one of a time and a transaction identifier; and allowing the aggregated monitoring data to be queried by a user.

7. The method of claim 1 wherein the first set of supports software components comprises one or more of a static web server component, a dynamic web server component and a language runtime component.

8. A method comprising:

installing, by a processing device, a web application on a first cloud-based platform together with a first version of a support package comprising a platform core and a first set of support software components selected for the web application based upon its dependencies, the first cloud-based platform corresponding to a first combination of cloud provider and hypervisor type, the first version of the support package being formulated for the first cloud-based platform;

executing the web application in the first cloud-based platform together with the first version of the support package;

installing, by the processing device, the web application on a second cloud-based platform together with a second version of a support package comprising the platform core and a second set of support software components selected for the web application based upon its dependencies, the second cloud-based platform corresponding to a second combination of cloud provider and hypervisor type that is distinct from the first combination, the second version of the support package being formulated for the second cloud-based platform; and executing the web application in the second cloud-based platform together with the second version of the support package.

9. The method of claim 8 wherein the first and second combinations have different cloud providers.

10. The method of claim 8 wherein the first and second combinations have different hypervisor types.

11. The method of claim 8 wherein installing the web application on the first cloud-based platform together with the first version of the support package comprises:

identifying dependencies of the web application in the first cloud-based platform;

identifying the first set of support software components using the dependencies;

loading a slab instance on one or more nodes, wherein the slab instance comprises the platform core;

adding to the slab instance the first version of the support package comprising instances of the identified first set of support software components; and loading the web application on the one or more nodes to run on top of the slab instance.

12. The method of claim 8 wherein executing the web application on the first cloud-based platform together with the first version of the support package comprises:

collecting monitoring data generated by the first set of support software components during execution, the monitoring data describing the execution of the first set of support software components;

aggregating the monitoring data based on at least one of a time and a transaction identifier; and allowing the aggregated monitoring data to be queried by a user.

13. The method of claim 1 wherein the first set of supports software components comprises one or more of a static web server component, a dynamic web server component and a language runtime component.

14. A non-transitory computer readable storage medium comprising instructions that, when executed by a processing device, cause the processing device to perform comprising:

installing a web application in a first environment together with a first version of a support package comprising a platform core and a first set of support software components selected for the web application based upon its dependencies, the first environment corresponding to a first life cycle stage of multiple life cycle states of the web application, the first version of the support package being formulated for the first environment;

executing the web application in the first environment together with the first version of the support package;

installing the web application in a second environment together with a second version of the support package comprising the platform core and a second set of support software components selected for the web application based upon its dependencies, the second environment corresponding to a second life cycle stage of the multiple life cycle states of the web application that succeeds the first life cycle stage of the web application, the second version of the support package being formulated for the second environment; and executing the web application in the second environment together with the second version of the support package.

15. The computer readable storage medium of claim 14 wherein the first life cycle stage of the web application is any one of a development stage, a testing stage and a staging stage, and the second life cycle stage of the web application is any one of a testing stage, staging stage and a production stage respectively.

16. The computer readable storage medium of claim 14 wherein installing the web application in the first environment together with the first version of the support package comprises:

identifying dependencies of the web application in the first environment;

identifying the first set of support software components using the dependencies;

loading a slab instance on one or more nodes, wherein the slab instance comprises the platform core;

adding to the slab instance the first version of the support package comprising instances of the identified first set of support software components; and loading the web application on the one or more nodes to run on top of the slab instance.

17. The computer readable storage medium of claim 14 wherein executing the web application in the first environment together with the first version of the support package comprises:

collecting monitoring data generated by the first set of support software components during execution, the monitoring data describing the execution of the first set of support software components;

aggregating the monitoring data based on at least one of a time and a transaction identifier; and allowing the aggregated monitoring data to be queried by a user.

18. The computer readable storage medium of claim 14 wherein the first set of supports software components comprises one or more of a static web server component, a dynamic web server component and a language runtime component.

19. A system comprising:

a memory; and a processing device, coupled to the memory, the processing device is to:

install a web application on a first cloud-based platform together with a first version of a support package comprising a platform core and a first set of support software components selected for the web application based upon its dependencies, the first cloud-based platform corresponding to a first combination of cloud provider and hypervisor type, the first version of the support package being formulated for the first cloud-based platform;

execute the web application in the first cloud-based platform together with the first version of the support package;

install a web application on a second cloud-based platform together with a second version of a support package comprising the platform core and a second set of support software components selected for the web application based upon its dependencies, the second cloud-based platform corresponding to a second combination of cloud provider and hypervisor type that is distinct from the first combination, the second version of the support package being formulated for the second cloud-based platform; and execute the web application in the second cloud-based platform together with the second version of the support package.

20. The system of claim 19 wherein the first and second combinations have different cloud providers.

21. The system of claim 19 wherein the first and second combinations have different hypervisor types.

22. The system of claim 19 wherein the processing device is to install the web application on the first cloud-based platform together with the first version of the support package by:

identifying dependencies of the web application in the first cloud-based platform;

identifying the first set of support software components using the dependencies;

loading a slab instance on one or more nodes, wherein the slab instance comprises the platform core;

adding to the slab instance the first version of the support package comprising instances of the identified support software components; and loading the web application on the one or more nodes to run on top of the slab instance.

23. The system of claim 19 wherein the processor is to execute the web application on the first cloud-based platform together with the first version of the support package by:

collecting monitoring data generated by the first set of support software components during execution, the monitoring data describing the execution of the first set of support software components;

aggregating the monitoring data based on at least one of a time and a transaction identifier; and allowing the aggregated monitoring data to be queried by a user.

24. The system of claim 19 wherein the first set of supports software components comprises one or more of a static web server component, a dynamic web server component and a language runtime component.

* * * * *